US012614803B2

(12) United States Patent
Hata et al.

(10) Patent No.: US 12,614,803 B2
(45) Date of Patent: Apr. 28, 2026

(54) BACKPACK TYPE ASSEMBLY AND BACKPACK TYPE CARRIER

(71) Applicant: MAKITA CORPORATION, Anjo (JP)

(72) Inventors: Tatsuya Hata, Anjo (JP); Satoshi Takahashi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 94 days.

(21) Appl. No.: 18/731,753

(22) Filed: Jun. 3, 2024

(65) Prior Publication Data

US 2024/0407535 A1      Dec. 12, 2024

(30) Foreign Application Priority Data

Jun. 12, 2023   (JP) ................................. 2023-096508
Jun. 12, 2023   (JP) ................................. 2023-096509

(51) Int. Cl.
| | |
|---|---|
| *H01M 50/256* | (2021.01) |
| *A45F 3/00* | (2006.01) |
| *A45F 3/04* | (2006.01) |

(52) U.S. Cl.
CPC ........... *H01M 50/256* (2021.01); *A45F 3/047* (2013.01); *A45F 2003/003* (2013.01)

(58) Field of Classification Search
CPC .. A45F 3/047; A45F 2003/003; H01M 50/256
USPC ...................................... 224/631, 637, 641
See application file for complete search history.

(56) References Cited

U.S. PATENT DOCUMENTS

| | | | | | |
|---|---|---|---|---|---|
| 2,104,486 | A | * | 1/1938 | Rolf .......................... | A45F 3/04 |
| | | | | | 224/634 |
| 4,015,759 | A | * | 4/1977 | Dreissigacker ........... | A45F 3/10 |
| | | | | | 224/262 |
| 5,004,135 | A | * | 4/1991 | Dufournet ............... | A45F 3/047 |
| | | | | | 224/907 |
| 5,284,279 | A | * | 2/1994 | Sason ..................... | A45F 3/047 |
| | | | | | 224/637 |
| 5,492,255 | A | * | 2/1996 | Gansky ..................... | A45F 3/08 |
| | | | | | 224/261 |
| 5,823,414 | A | * | 10/1998 | Gal .......................... | A45F 3/04 |
| | | | | | 224/636 |

(Continued)

FOREIGN PATENT DOCUMENTS

CN          217114657 U       8/2022

*Primary Examiner* — Justin M Larson
(74) *Attorney, Agent, or Firm* — Sughrue Mion, PLLC

(57) ABSTRACT

A backpack type assembly may include a backpack type carrier configured to be worn by a user and a device configured to be attached to the backpack type carrier. The backpack type carrier may include a pair of shoulder straps configured to be worn on both shoulders of the user, a back plate to which the pair of shoulder straps and the device are attached, a waist belt configured to be wrapped around a waist of the user, and a connection mechanism configured to connect between the back plate and the waist belt. The connection mechanism may include an elastic member having a flexural rigidity smaller than a flexural rigidity of the back plate. A force applied to the connection mechanism from one of the back plate and the waist belt may be transmitted through the elastic member to the other of the back plate and the waist belt.

16 Claims, 15 Drawing Sheets

(56)  References Cited

U.S. PATENT DOCUMENTS

| | | | | |
|---|---|---|---|---|
| 6,276,584 | B1 * | 8/2001 | McLachlan | A45F 3/08 224/633 |
| 6,848,120 | B2 * | 2/2005 | Kling | A62B 9/04 224/604 |
| 7,537,143 | B1 * | 5/2009 | Collier | A45F 3/08 224/633 |
| 7,770,766 | B2 * | 8/2010 | Foissac | A45F 3/047 224/628 |
| 8,714,424 | B2 * | 5/2014 | Oddou | A45F 3/04 224/637 |
| 8,991,671 | B2 * | 3/2015 | Gill | A45F 3/08 224/628 |
| 9,220,333 | B2 * | 12/2015 | Losos | A45F 3/047 |
| 9,402,456 | B2 * | 8/2016 | Shtriker | A45F 3/08 |
| 9,700,122 | B2 * | 7/2017 | Pelland | A41D 13/0531 |
| 10,080,418 | B2 * | 9/2018 | Wagner | A45F 3/02 |
| 10,230,077 | B2 * | 3/2019 | Rief | H01M 50/247 |
| 10,470,552 | B2 * | 11/2019 | Ripepi | A45F 3/10 |
| 10,849,409 | B2 * | 12/2020 | Moncreiff | A45F 3/08 |
| 10,920,928 | B2 * | 2/2021 | Lennings | A45F 3/14 |
| 10,993,521 | B2 * | 5/2021 | Diard | A45F 3/08 |
| 11,058,210 | B2 * | 7/2021 | Lennings | F16M 13/04 |
| 12,064,026 | B2 * | 8/2024 | Wilsey | A45F 3/12 |
| 12,121,134 | B2 * | 10/2024 | Koike | A45F 3/04 |
| 12,121,135 | B2 * | 10/2024 | Koike | A45F 3/04 |
| 2005/0082330 | A1 * | 4/2005 | Fehlberg | A45F 3/047 224/637 |
| 2015/0144675 | A1 * | 5/2015 | Losos | A45F 3/047 224/637 |
| 2015/0173493 | A1 * | 6/2015 | Kax | A45F 3/047 224/641 |
| 2016/0255942 | A1 | 9/2016 | Wagner et al. | |
| 2021/0100339 | A1 * | 4/2021 | Moncreiff | A45F 3/047 |

* cited by examiner

UP

RIGHT    REAR

FRONT    LEFT

DOWN

UP

RIGHT        FRONT

REAR        LEFT

DOWN

4

16

14

34

12(8)

60a

80

60b

40

36

78

76(70)

80

34

60c

38

60d

UP

LEFT        FRONT

REAR        RIGHT

DOWN

UP

RIGHT    REAR

FRONT    LEFT

DOWN

UP

REAR ⟵⟶ FRONT

DOWN

FIG. 14

UP
FRONT ← → REAR
DOWN

BACKPACK TYPE ASSEMBLY AND BACKPACK TYPE CARRIER

REFERENCE TO RELATED APPLICATIONS

This application claims priority to Japanese Patent Application No. 2023-96508 filed on Jun. 12, 2023 and Japanese Patent Application No. 2023-96509 filed on Jun. 12, 2023, the entire contents of which are incorporated herein by reference.

TECHNICAL FIELD

Art disclosed herein relates to backpack type assemblies and backpack type carriers.

BACKGROUND ART

United States Patent Application Publication No. 2016/0255942 describes a backpack type assembly including a backpack type carrier configured to be worn by a user and a device configured to be attached to the backpack type carrier. The backpack type carrier includes a pair of shoulder straps configured to be worn on both shoulders of the user, a back plate to which the pair of shoulder straps and the device are attached, a waist belt configured to be wrapped around the waist of the user, and a connection mechanism configured to connect between the back plate and the waist belt. The connection mechanism includes a hinge that connects the waist belt to the back plate such that the waist belt is rotatable relative to the back plate about an axis along a left-right direction.

SUMMARY

Since the hinge is positioned between the back plate and the waist belt in the backpack type assembly in United States Patent Application Publication No. 2016/0255942, when the user changes his/her posture from an upright posture to a stooped posture or a backbend posture, the back plate and the waist belt move following the user's posture change. This configuration, however, puts a large load on the lower back of the user when the user assumes the stooped posture, which may increase a strain on the lower back of the user. The disclosure herein provides teachings that enable to reduce a strain on the lower back of a user wearing a backpack type assembly.

A backpack type assembly disclosed herein may comprise a backpack type carrier configured to be worn by a user and a device configured to be attached to the backpack type carrier. The backpack type carrier may comprise a pair of shoulder straps configured to be worn on both shoulders of the user, a back plate to which the pair of shoulder straps and the device are attached, a waist belt configured to be wrapped around a waist of the user, and a connection mechanism configured to connect between the back plate and the waist belt. The connection mechanism may comprise an elastic member having a flexural rigidity smaller than a flexural rigidity of the back plate. A force applied to the connection mechanism from one of the back plate and the waist belt may be transmitted through the elastic member to the other of the back plate and the waist belt.

A backpack type carrier disclosed herein may be configured to be worn by a user to carry an object. The backpack type carrier may comprise a pair of shoulder straps configured to be worn on both shoulders of the user, a back plate to which the pair of shoulder straps is attached and the object is detachably attached, a waist belt configured to be wrapped around a waist of the user, and a connection mechanism configured to connect between the back plate and the waist belt. The connection mechanism may comprise an elastic member having a flexural rigidity smaller than a flexural rigidity of the back plate. A force applied to the connection mechanism from one of the back plate and the waist belt may be transmitted through the elastic member to the other of the back plate and the waist belt.

In the configuration above, the elastic member deforms when the user changes his/her posture, so that the back plate and the waist belt move following the user's posture change. When the user assumes a stooped posture, the back plate is moved away from the waist belt by an elastic restoring force of the elastic member. Specifically, the back plate is moved away from the waist belt on fulcrums near the shoulders of the user. This increases a load on the shoulders of the user but reduces a load on the lower back of the user. Therefore, the configuration above can reduce a strain on the lower back of the user wearing the backpack type assembly (or the backpack type carrier).

It should be noted that the wording "an elastic member having a flexural rigidity smaller than a flexural rigidity of the back plate" used herein means that the elastic member includes a portion having a flexural rigidity smaller than the smallest flexural rigidity in a portion of the back plate.

BRIEF DESCRIPTION OF DRAWINGS

FIG. 14 shows a left side view of the lower portion of the backpack type carrier body 8 and the stand member 10 of the backpack type assembly 2 according to the embodiment.

DESCRIPTION

Figure 1:
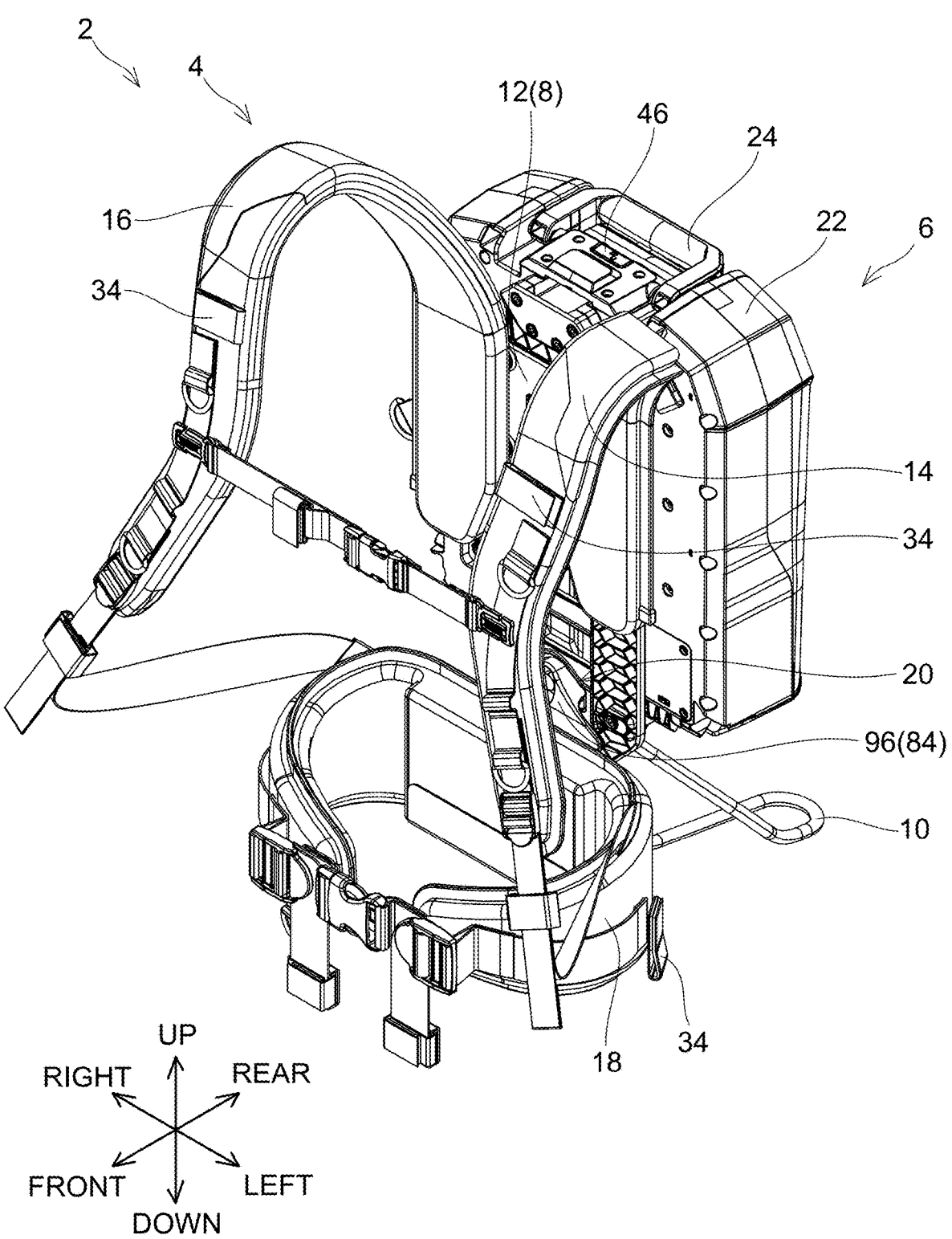
FIG. 1 shows a backpack type assembly 2 according to an embodiment, as viewed from the upper front left side.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved backpack type assemblies and backpack type carriers as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the elastic member may be disposed forward of a front surface of the back plate.

According to the configuration above, the elastic member is positioned forward of the front surface of the back plate, and thus the back plate is separated rearward from the waist belt by the elastic member. This provides a clearance between the back of the user and the back plate, thereby improving airflow between the back of the user and the back plate.

In one or more embodiments, the elastic member may comprise a plate portion extending along a rear surface of the waist belt and attached to the waist belt such that an orientation of the plate portion relative to the waist belt does not change, a fastening portion disposed rearward of a rear surface of the plate portion and configured to be fastened to the front surface of the back plate by a predetermined fastener, and a connection portion connecting between the plate portion and the fastening portion.

In the configuration above, the back plate is separated rearward from the waist belt by the elastic member. This provides a clearance between the back of the user and the back plate, thereby improving airflow between the back of the user and the back plate.

In one or more embodiments, the fastening portion may be disposed above an upper end of the plate portion.

The configuration above provides a larger clearance between the back of the user and the back plate than a clearance therebetween provided by a configuration in which the fastening portion is disposed below the upper end of the plate portion. Therefore, the effect of improving airflow between the back of the user and the back plate is more remarkable.

In one or more embodiments, the connection portion may comprise a connection surface connected to a front surface of the plate portion and extending upward from an upper end of the plate portion. The connection surface may comprise a curved surface curving away from an imaginary plane that is an imaginary extension of the front surface of the plate portion, and the curved surface separates farther away from the imaginary plane at its portions farther away from the upper end of the plate portion.

Since the fastening portion is disposed above the upper end of the plate portion, the connection portion may protrude upward beyond the upper end of the waist belt. In this case, the front surface of the connection portion (i.e., the connection surface thereof) may contact the lower back or back of the user while the user is using the backpack type assembly, which may make the user feel uncomfortable. According to the configuration above, the front surface of the connection portion includes the curved surface that curves farther rearward at its portions farther away from the upper end of the plate portion. Thus, the front surface of the connection portion is less likely to contact the lower back or back of the user. Therefore, the user is less likely to feel the uncomfortableness.

In one or more embodiments, in a front view, a width of the connection surface in a left-right direction may decrease monotonically as a distance from the upper end of the plate portion increases.

If the width of the connection surface in the left-right direction increases monotonically as the distance from the upper end of the plate portion increases, a sufficient space to place components other than the elastic member may not be secured. According to the configuration above, the width of the connection surface in the left-right direction decreases monotonically as the distance from the upper end of the plate portion increases, and thus a sufficient space can be secured to place components other than the elastic member.

In one or more embodiments, the connection portion may further comprise a recess recessed rearward from the connection surface. The fastening portion may be disposed at a bottom of the recess.

The configuration above allows a fastener for fastening the fastening portion to be positioned within the recess. This prevents the user from accidentally touching the fastener.

In one or more embodiments, the elastic member may further comprise a contact surface contacting a front surface of the back plate and a guide projection projecting rearward from the contact surface. The back plate may comprise a guide hole receiving the guide projection.

The configuration above prevents the elastic member from moving in an up-down direction and in the left-right direction relative to the back plate. Thus, the elastic member can be fixed in position relative to the back plate in the up-down direction and the left-right direction.

In one or more embodiments, in a side view, a portion of the back plate below a lower end of the fastening portion may be warped rearward.

While the user is using the backpack type assembly, the waist belt may move rearward and contact the back plate, which may make the user wearing the backpack type assembly feel uncomfortable. According to the configuration above, the back plate is warped rearward, and thus the waist belt is less likely to contact the back plate. This prevents the user from feeling the uncomfortableness.

In one or more embodiments, the back plate may comprise a back plate body to which the device is detachably attached, a support plate connected to the waist belt via the connection mechanism and configured to be movable in an up-down direction relative to the back plate body, and a locking mechanism configured to fix a position of the support plate relative to the back plate body in the up-down direction.

The configuration above allows the user to adjust the position of the waist belt relative to the back plate body by changing the position of the support plate relative to the back plate body.

In one or more embodiments, the device may be a power supply including a plurality of rechargeable battery cells.

The configuration above allows the user to carry the power supply on his/her back to various places. Thus, the user can carry the power supply to a place where connection to a commercial power supply is impossible and use an electronic device by supplying electric power to the electronic device from the power supply.

Another backpack type assembly disclosed herein may comprise a backpack type carrier configured to be worn by a user and a device configured to be attached to the backpack type carrier. The backpack type carrier may comprise a backpack type carrier body to which the device is attached and including a pair of shoulder straps configured to be worn on both shoulders of the user and a stand member attached to the backpack type carrier body in a non-rotatable manner. The stand member may comprise an upper coupling portion coupled to the backpack type carrier body, a lower coupling portion coupled to the backpack type carrier body below the upper coupling portion, a left foot portion positioned rearward and leftward of the backpack type carrier body, and a right foot portion positioned rearward and rightward of the backpack type carrier body. The backpack type assembly may be configured to be placed on a placement surface by bringing a lower part of the backpack type carrier body, the left foot portion, and the right foot portion into contact with the placement surface.

Another backpack type carrier disclosed herein may be configured to be worn by a user for carrying an object. The backpack type carrier may comprise a backpack type carrier body to which the object is detachably attached and including a pair of shoulder straps configured to be worn on both shoulders of the user and a stand member attached to the backpack type carrier body in a non-rotatable manner. The stand member may comprise an upper coupling portion coupled to the backpack type carrier body, a lower coupling portion coupled to the backpack type carrier body below the upper coupling portion, a left foot portion positioned rearward and leftward of the backpack type carrier body, and a right foot portion positioned rearward and rightward of the backpack type carrier body. The backpack type carrier may be configured to be placed on a placement surface by bringing a lower part of the backpack type carrier body, the left foot portion, and the right foot portion into contact with the placement surface in the state of having the object attached to the backpack type carrier body.

According to the configurations above, the stand member is not rotatable relative to the backpack type carrier body and the stand member is coupled to the backpack type carrier body at at least two points in the up-down direction. This relatively stabilizes the orientation of the stand member relative to the backpack type carrier body. Therefore, even when the backpack type assembly (or the backpack type carrier) experiences an impact and/or vibration while placed on the placement surface, the orientation of the stand member does not change easily. Thus, the configurations above provide the backpack type assembly (or the backpack type carrier) that is less likely to fall when placed on the placement surface.

In one or more embodiments, the stand member may further comprise a first extension portion having a rod shape and extending between the left foot portion and the upper coupling portion, a second extension portion having a rod shape and extending between the left foot portion and the lower coupling portion, a third extension portion having a rod shape and extending between the right foot portion and the upper coupling portion, and a fourth extension portion having a rod shape and extending between the right foot portion and the lower coupling portion.

When the backpack type assembly is on the placement surface, the stand member receives a force from each of the placement surface and the backpack type carrier body. Depending on the shape of the stand member, the stand member may be subjected to large local stress. The configuration above allows the forces the stand member receives from the placement surface and the backpack type carrier body to distribute in a balanced manner to the first extension portion, the second extension portion, the third extension portion, and the fourth extension portion. This prevents the stand member from being subjected to large local stress.

In one or more embodiments, in a top view, the first extension portion may be offset leftward from the second extension portion. In the top view, the third extension portion may be offset rightward from the fourth extension portion.

The configuration above improves visual sturdiness of the stand member.

In one or more embodiments, the stand member may further comprise a left bent portion having a shape of a rod bent in U-shape and connecting between the first extension portion and the second extension portion and a right bent portion having a shape of a rod bent in U-shape and connecting between the third extension portion and the fourth extension portion. The left foot portion may be located on a lower surface of the left bent portion. The right foot portion may be located on a lower surface of the right bent portion.

If the left bent portion (or the right bent portion) has a shape of a rod bent in V-shape, the left foot portion (or the right foot portion) has a relatively pointed shape correspondingly. This may cause the stand member to lose its balance relative to the placement surface when the backpack type assembly experiences a slight impact and/or vibration while being on the placement surface, resulting in the backpack type assembly being prone to falling. According to the configuration above, the left bent portion (and the right bent portion) has a shape of a rod bent in U-shape, and thus the left foot portion (or the right foot portion) has a relatively rounded shape accordingly. Thus, the stand member does not lose its balance easily relative to the placement surface even when the backpack type assembly experiences an impact and/or vibration while being on the placement surface. Therefore, the configuration above provides the backpack type assembly that is more resistant to falling.

In one or more embodiments, the backpack type assembly may further comprise a coupling member configured to couple the lower coupling portion of the stand member to the backpack type carrier body. The coupling member may comprise an end surface configured to contact the placement surface when the backpack type assembly is placed on the placement surface.

According to the configuration above, the coupling member contacts the placement surface when the backpack type assembly is placed on the placement surface. Thus, there is no need to provide another member that contacts the placement surface when the backpack type assembly is placed thereon. This allows for a reduction in the number of components of the backpack type assembly.

In one or more embodiments, the stand member may be formed by bending a single rod-shaped member.

For example, the stand member can be formed by connecting multiple rod-shaped members by welding or the like. This, however, takes time and efforts to form the stand member. According to the configuration above, the stand member is formed by bending a single rod-shaped member. Therefore, time and efforts to form the stand member can be relatively reduced.

In one or more embodiments, the rod-shaped member may be a hollow pipe.

In the configuration above, a hollow pipe is used as the rod-shaped member, and thus the weight of the stand member can be reduced as compared to a configuration where a solid material is used as the rod-shaped member.

In one or more embodiments, the device may be a power supply including a plurality of rechargeable battery cells.

The configuration above allows the user to carry the power supply on his/her back to various places. Thus, the user can carry the power supply to a place where connection to a commercial power supply is impossible and use an electronic device by supplying electric power to the electronic device from the power supply.

In one or more embodiments, in a left side view, an angle formed by a straight line connecting the upper coupling portion and the lower coupling portion and a straight line connecting the lower coupling portion and the left foot portion may be 90 degrees or more. In a right side view, an angle formed by a straight line connecting the upper coupling portion and the lower coupling portion and a straight line connecting the lower coupling portion and the right foot portion may be 90 degrees or more.

If the upper coupling portion is offset rearward from the lower coupling portion, the center of gravity of the backpack type assembly may be positioned too rearward when the backpack type assembly is placed on the placement surface depending on the weight and shape of the device. In this case, a slight rearward tilt of the backpack type assembly may cause it to fall. According to the configuration above, the upper coupling portion is offset forward from the lower coupling portion, and thus the center of gravity of the backpack type assembly is positioned relatively forward when it is placed on the placement surface. This prevents the center of gravity of the backpack type assembly from being positioned too rearward when it is placed on the placement surface. Therefore, the configuration above provides the backpack type assembly that is more resistant to falling.

Embodiment

A backpack type assembly 2 (which may be simply termed "assembly 2" hereinafter) shown in FIG. 1 includes a backpack type carrier 4 (which may be simply termed "carrier 4" hereinafter) configured to be worn by a user and a power supply 6 configured to be detachably attached to the carrier 4. The assembly 2 is configured to allow the user to use it on his/her back and supply electric power to various electronic devices. The carrier 4 includes a backpack type carrier body 8 (which may be simply termed "carrier body 8" hereinafter) and a stand member 10. The carrier body 8 includes a back plate 12 to which the power supply 6 is detachably attached, a left shoulder strap 14 configured to be worn on the left shoulder of the user, a right shoulder strap 16 configured to be worn on the right shoulder of the user, a waist belt 18 configured to be wrapped around the waist of the user, and a connection mechanism 20 connecting between the back plate 12 and the waist belt 18. In the disclosure herein, a front-rear direction, a left-right direction, and up-down direction with reference to the user standing upright with the assembly 2 worn on his/her back are defined as a front-rear direction, a left-right direction, and an up-down direction of the assembly 2.

Figure 2:
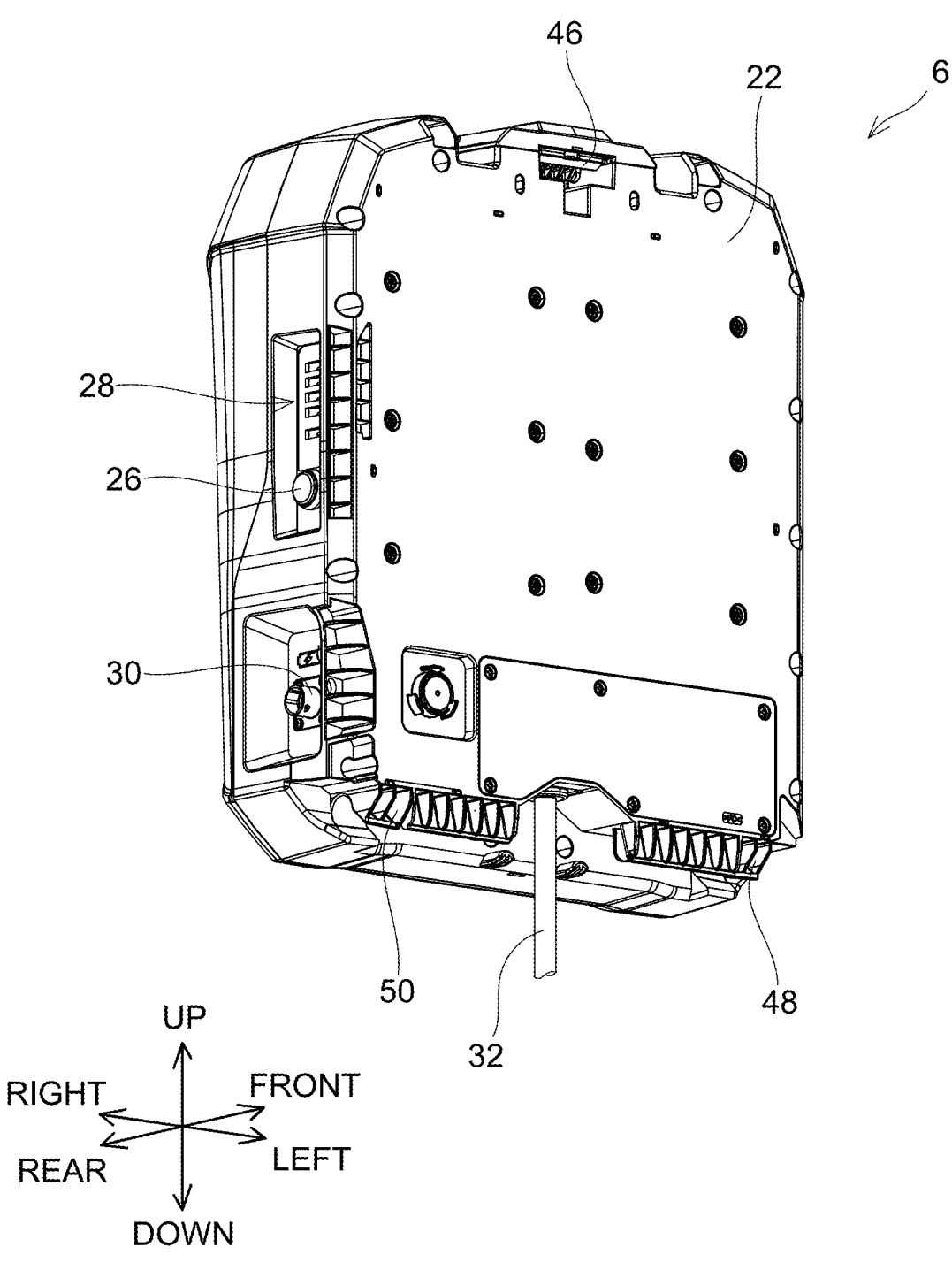
FIG. 2 shows a power supply 6 of the backpack type assembly 2 according to the embodiment, as viewed from the lower front right side.

As shown in FIG. 2, the power supply 6 has a substantially cuboid shape. The power supply 6 includes a housing 22, a handle 24 (see FIG. 1), a power switch 26, a display LED 28, a charging connector 30, and a power cable 32 (only partially shown). The housing 22 houses a plurality of rechargeable secondary battery cells (e.g., lithium-ion battery cells) therein, although this is not shown. The handle 24 is attached to an upper portion of the housing 22. The user can carry the power supply 6, which has been detached from the carrier 4, by gripping the handle 24. The power switch 26 is disposed on the right side surface of the housing 22. The user can switch on/off of the main power of the power supply 6 by manipulating the power switch 26. The display LED 28 is disposed on the right side surface of the housing 22 above the power switch 26. The display LED 28 is configured to display remaining battery charge, etc. of the power supply 6. The charging connector 30 is disposed on the right side surface of the housing 22 below the power switch 26. The user can insert a charging plug (not shown) connected to an external power source to the charging connector 30 to charge the plurality of secondary battery cells with electric power supplied from the external power source. The power cable 32 extends downward from the lower surface of the housing 22. The user can connect a power feeder plug (not shown) at the distal end of the power cable 32 to a variety of electronic devices to actuate these electronic devices using the electric power stored in the plurality of secondary battery cells. As shown in FIG. 1, the carrier 4 includes a plurality of cable holders 34 configured to hold the power cable 32. The user can arrange the power cable 32 such that it follows the contour of the carrier 4 by having the plurality of cable holders 34 hold the power cable 32.

Figure 3:
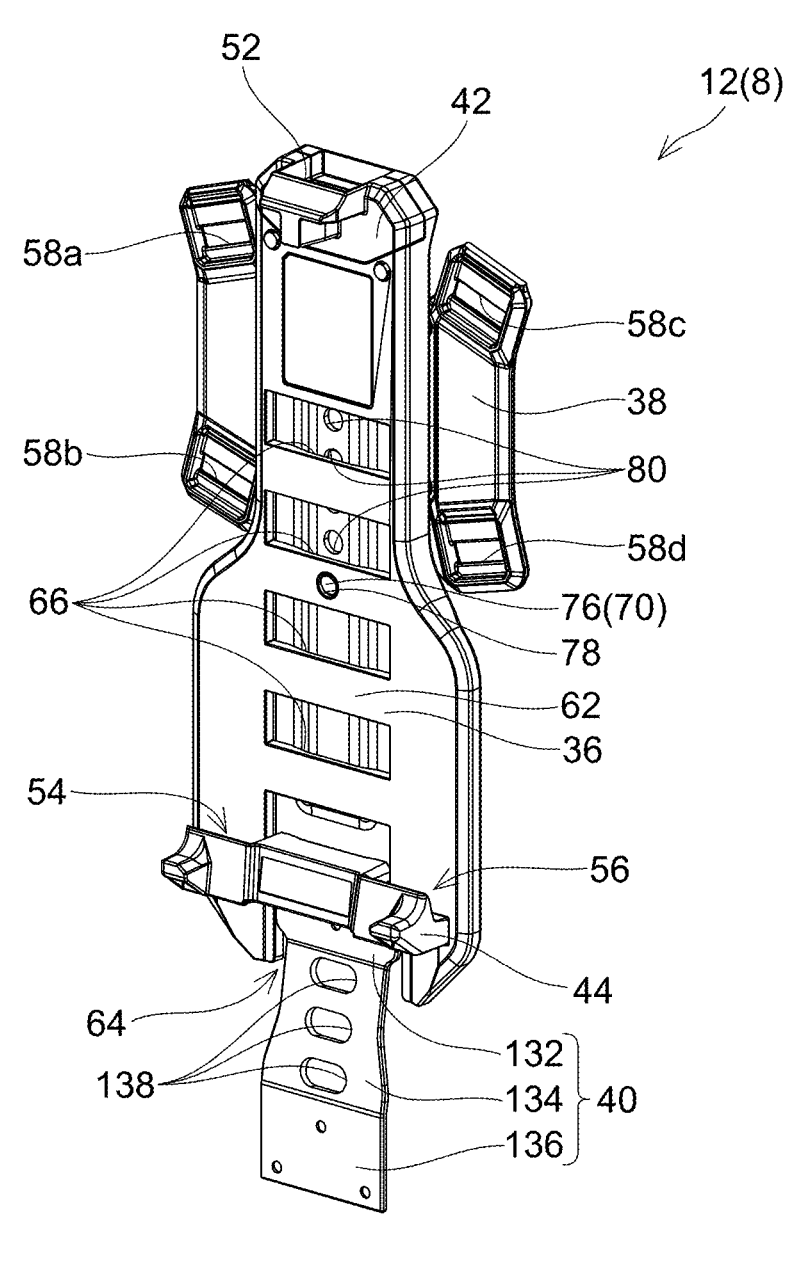
FIG. 3 shows a back plate 12 of the backpack type assembly 2 according to the embodiment, as viewed from the upper rear right side.
Figure 3:
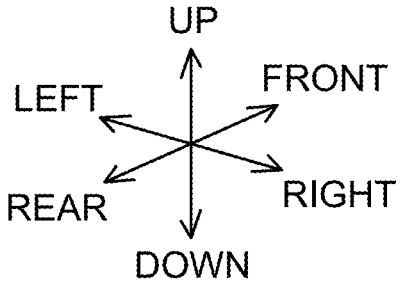

As shown in FIG. 3, the back plate 12 includes a back plate body 36, a strap attachment plate 38, a slide plate 40, an upper engagement member 42, and a lower engagement member 44. A plastic material (e.g., polyamide) is used for the back plate body 36. A plastic material (e.g., polyethylene) is used for the strap attachment plate 38. A metal material (e.g., aluminum alloy) is used for the slide plate 40. A metal material (e.g., aluminum alloy) is used for the upper engagement member 42. A metal material (e.g., aluminum alloy) is used for the lower engagement member 44.

As shown in FIG. 2, a latch 46 configured to be manipulated by the user is provided in the upper portion of the housing 22 of the power supply 6. Further, a left engagement claw 48 and a right engagement claw 50 that project downward are provided in a lower front portion of the housing 22. As shown in FIG. 3, the upper engagement member 42 includes a latch receiver 52 corresponding to the latch 46 (see FIG. 2) of the power supply 6. The upper engagement member 42 is fixed to an upper portion of the back plate body 36. The lower engagement member 44 includes a left receiver 54 and a right receiver 56 corresponding to the left engagement claw 48 (see FIG. 2) and the right engagement claw 50 (see FIG. 2) of the power supply 6, respectively. The lower engagement member 44 is fixed to a lower portion of the back plate body 36. The user can attach the power supply 6 to the back plate body 36 by engaging the left engagement claw 48 and the right engagement claw 50 with the left receiver 54 and the right receiver 56, respectively and engaging the latch 46 with the latch receiver 52. The user can release the engagement between the latch 46 and the latch receiver 52 by manipulating the latch 46 of the power supply 6 attached to the back plate body 36. The user can detach the power supply 6 from the back plate body 36 by moving the power supply 6 rearward and upward relative to the back plate body 36 and thereby pulling out the left engagement claw 48 and the right engagement claw 50 from the left receiver 54 and the right receiver 56 after releasing the engagement between the latch 46 and the latch receiver 52.

Figure 4:
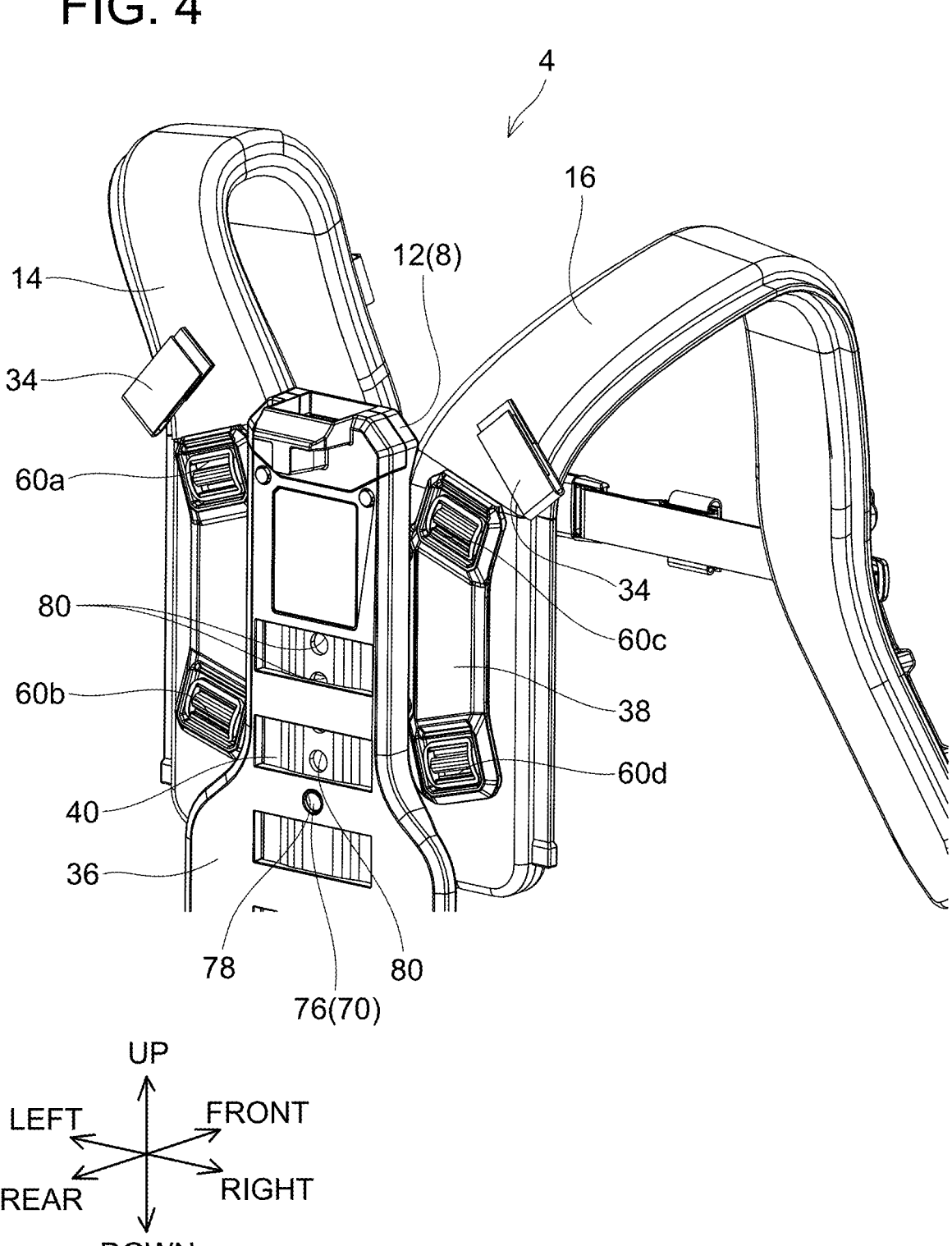
FIG. 4 shows an upper portion of a backpack type carrier body 8 of the backpack type assembly 2 according to the embodiment, as viewed from the upper rear right side.

The strap attachment plate 38 is fixed to the front surface of the back plate body 36. Attachment holes 58a, 58b, 58c, 58d are defined in the strap attachment plate 38. As shown in FIG. 4, attachment buckles 60a, 60b are provided in a rear portion of the left shoulder strap 14 at positions corresponding to the attachment holes 58a, 58b (see FIG. 3). Further, attachment buckles 60c, 60d are provided in a rear portion of the right shoulder strap 16 at positions corresponding to the attachment holes 58c, 58d (see FIG. 3). The user can attach the left shoulder strap 14 and the right shoulder strap 16 to the strap attachment plate 38 by attaching the attachment buckles 60a, 60b, 60c, 60d to the attachment holes 58a, 58b, 58c, 58d, respectively. Further, the user can detach the left shoulder strap 14 and the right shoulder strap 16 from the strap attachment plate 38 by detaching the attachment buckles 60a, 60b, 60c, 60d from the attachment holes 58a, 58b, 58c, 58d.

Figure 5:
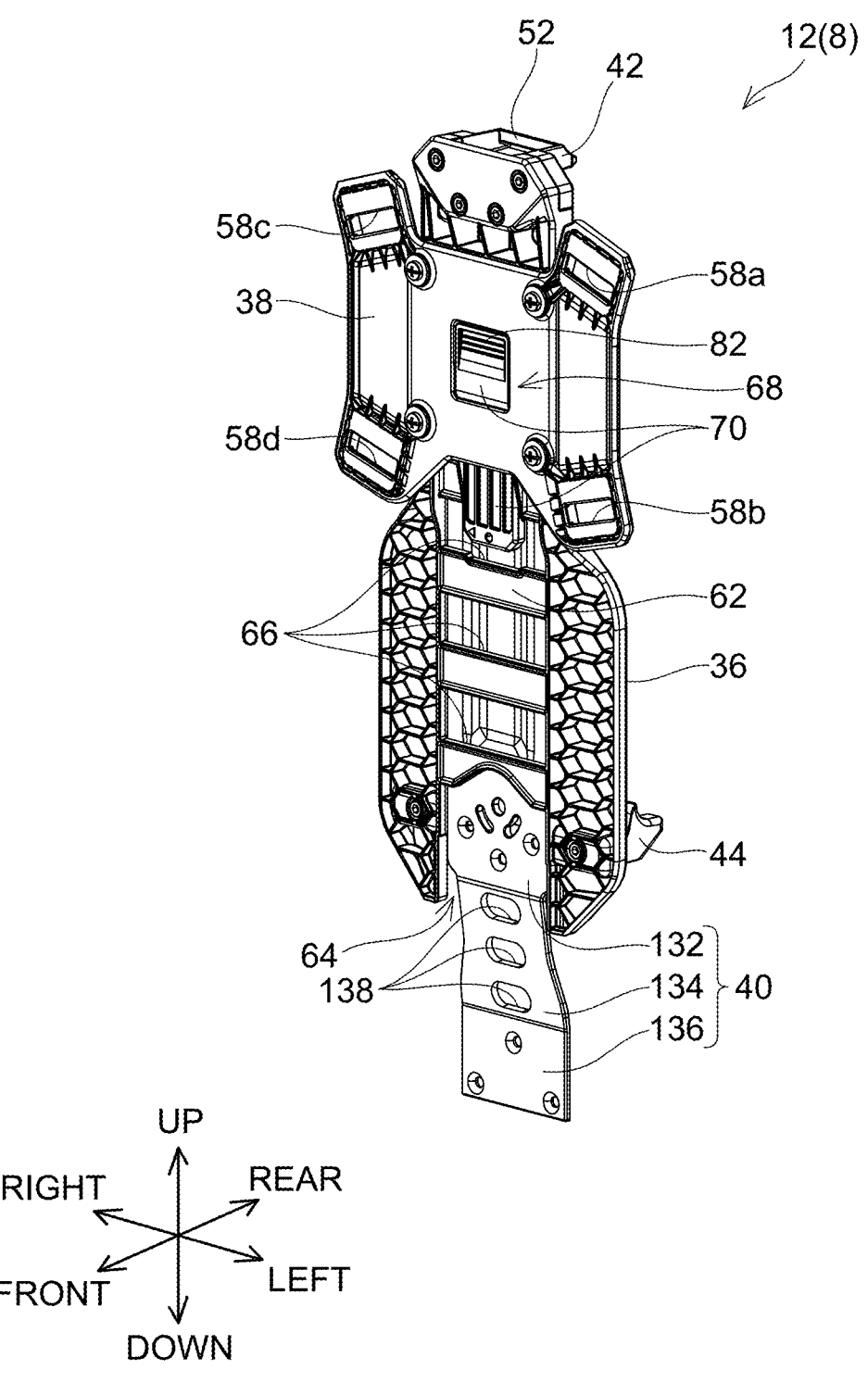
FIG. 5 shows the back plate 12 of the backpack type assembly 2 according to the embodiment, as viewed from the upper front left side.

As shown in FIGS. 3 and 5, the back plate body 36 includes a sleeve portion 62 configured to receive the slide plate 40 such that the slide plate 40 can slide in the up-down direction. The sleeve portion 62 has an opening 64 at its lower end. The slide plate 40 is inserted in the sleeve portion 62 through the opening 64. A plurality of windows 66 is defined in front and rear walls of the sleeve portion 62. The windows 66 allow the slide plate 40 in the sleeve portion 62 to be seen from the outside of the back plate body 36.

Figure 6:
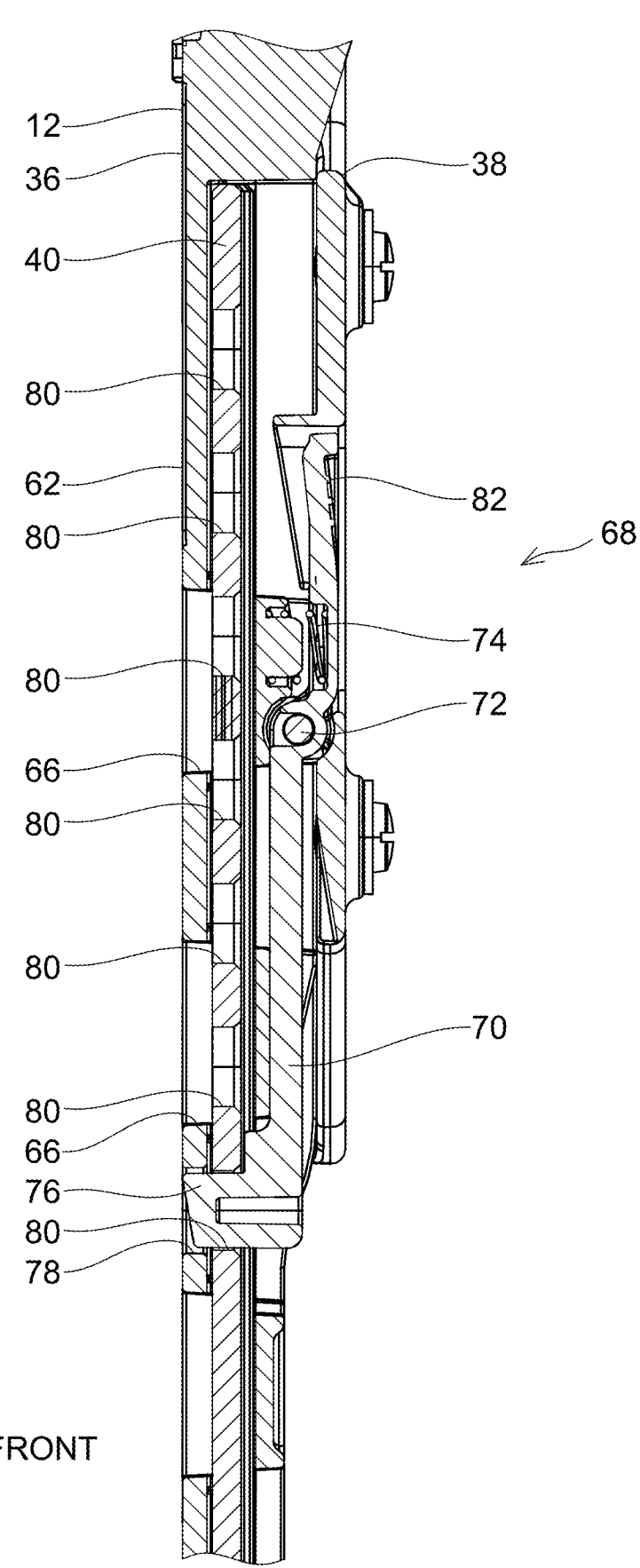
FIG. 6 shows a cross-sectional view of a structure around a locking mechanism 68 of the backpack type assembly 2 according to the embodiment.

As shown in FIGS. 5 and 6, the back plate 12 further includes a locking mechanism 68 configured to lock the slide plate 40 relative to the back plate body 36. The locking mechanism 68 includes a locking member 70, a shaft 72, and a coil spring 74. The locking member 70 is supported by the back plate 12 via the shaft 72 such that the locking member 70 is swingable relative to the back plate 12. Above the shaft 72, the coil spring 74 biases the locking member 70 forward relative to the back plate body 36. This applies a moment that rotates the locking member 70 clockwise about the shaft 72 in the right side view to the locking member 70. The locking member 70 includes a projection 76 projecting rearward from the rear surface of the locking member 70. Since the projection 76 is positioned below the shaft 72, the projection 76 is biased rearward by the moment applied to the locking member 70. A through hole 78 is defined in the rear wall of the sleeve portion 62 at a position corresponding to the projection 76. Further, a plurality of engagement holes 80 is defined in the slide plate 40 and the engagement holes 80 are spaced apart from each other at predetermined intervals in the up-down direction. Usually, the projection 76 of the locking member 70 is through one of the engagement holes 80 of the slide plate 40 and inserted in the through hole 78 of the sleeve portion 62. In this way, the slide plate 40 is locked relative to the back plate body 36.

The locking member 70 includes a manipulation portion 82 configured to be manipulated by the user. The manipulation portion 82 is provided on the front surface of the locking member 70 above the shaft 72. When the user pushes the manipulation portion 82 against the biasing force of the coil spring 74, the projection 76 of the locking member 70 comes out from the engagement hole 80 of the slide plate 40 and the through hole 78 of the sleeve portion 62, thereby releasing the locking of the slide plate 40 to the back plate body 36. Once the locking of the slide plate 40 to the back plate body 36 has been released, the user can slide the slide plate 40 relative to the back plate body 36. Thus, the user can suitably change an engagement hole 80 to be aligned with the projection 76 and the through hole 78. When the user stops pushing the manipulation portion 82, the projection 76 passes through an engagement hole 80 and the slide plate 40 is thereby locked to the back plate body 36 again. Following the sequence of actions described above, the user can suitably change the locking position of the slide plate 40 relative to the back plate body 36 in the up-down direction. Since the waist belt 18 (see FIG. 1) is attached to the slide plate 40, the user can adjust the position of the waist belt 18 relative to the back plate body 36 by changing the locking position of the slide plate 40 relative to the back plate body 36.

Features of Connection Mechanism 20

Figure 7:
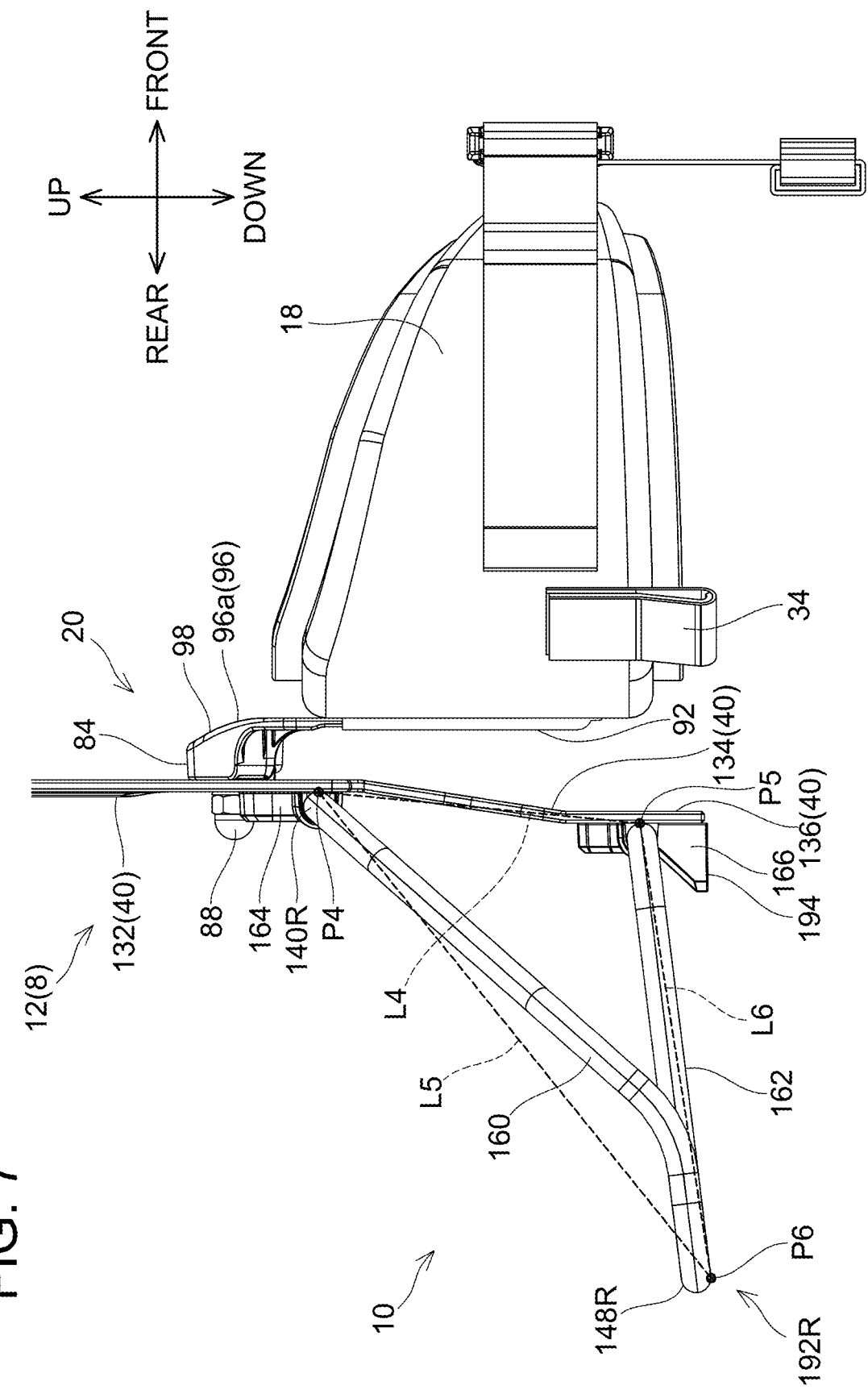
FIG. 7 shows a right side view of a lower portion of the backpack type carrier body 8 and a stand member 10 of the backpack type assembly 2 according to the embodiment.

As shown in FIG. 7, the connection mechanism 20 includes an elastic member 84 disposed between the slide plate 40 and the waist belt 18. A force applied to the connection mechanism 20 from one of the back plate 12 and the waist belt 18 is transmitted to the other of the back plate 12 and the waist belt 18 through the elastic member 84. A plastic material (e.g., polyethylene) is used for the elastic member 84.

Figure 8:
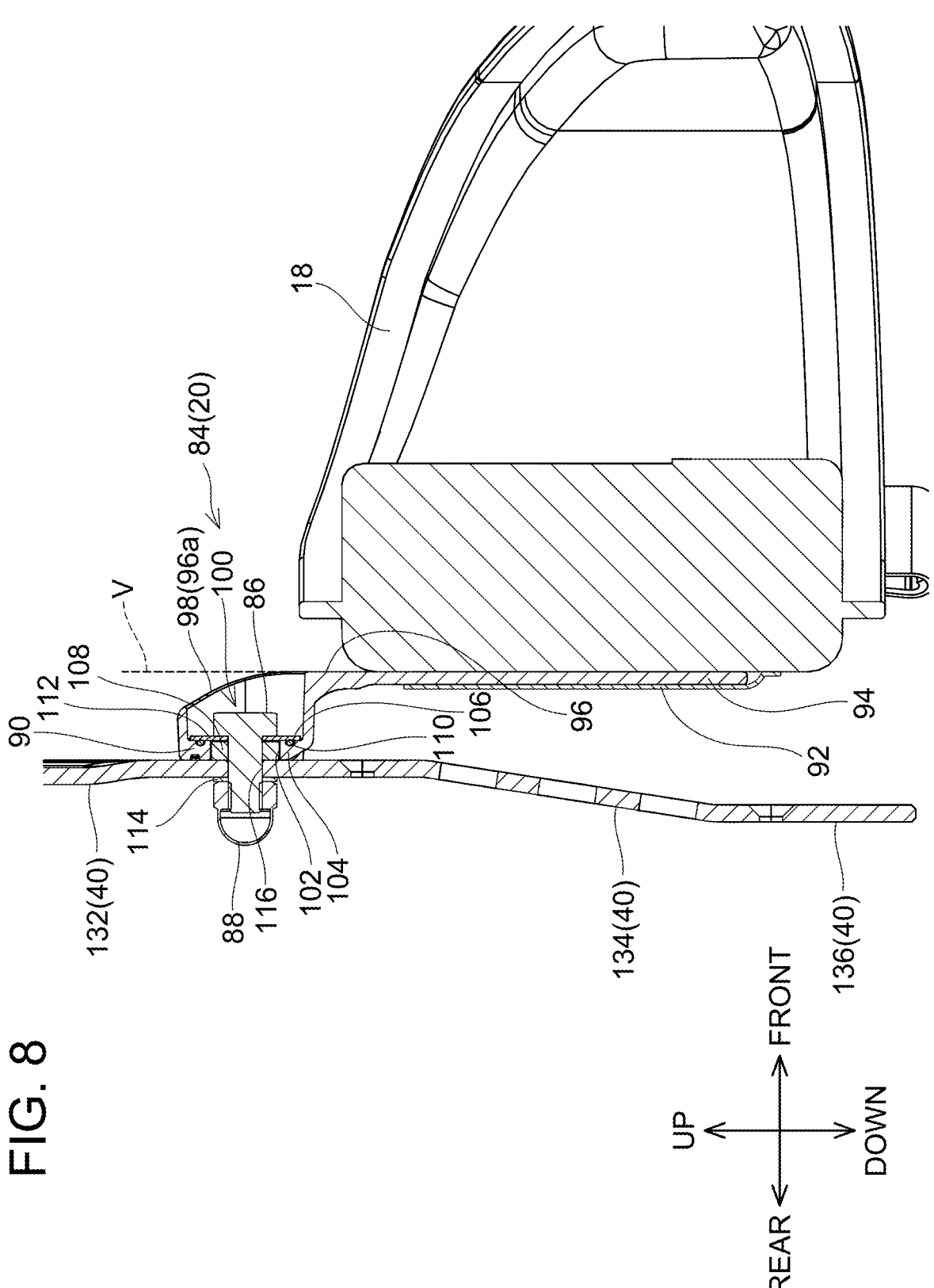
FIG. 8 shows a cross-sectional view of a structure around a connection mechanism 20 of the backpack type assembly 2 according to the embodiment.

As shown in FIG. 8, the elastic member 84 includes a fastening portion 90 configured to be fastened to the front surface of the slide plate 40 with a bolt 86 and a nut 88, a plate portion 94 configured to be housed in a pocket 92 provided on the rear surface of the waist belt 18, and a connection portion 96 connecting between the plate portion 94 and the fastening portion 90. The plate portion 94 extends in the up-down direction and in the left-right direction. A front surface 96a of the connection portion 96 is smoothly connected to the front surface of the plate portion 94 at the upper end of the plate portion 94. The front surface 96a of the connection portion 96 includes a curved surface 98 that curves away from an imaginary plane V, which is an imaginary extension of the front surface of the plate portion 94. The curved surface 98 curves farther away from the imaginary plane V at its portions farther away from the upper end of the plate portion 94. The rear surface of the connection portion 96 is connected to the rear surface of the plate portion 94 at the upper end of the plate portion 94. The rear surface of the plate portion 94 curves farther rearward at its portions closer to the upper end of the plate portion 94. The connection portion 96 includes a recess 100 recessed rearward from the front surface 96a. The fastening portion 90 is disposed at the bottom of the recess 100. The fastening portion 90 includes a bush attachment hole 102 penetrating the bottom of the recess 100 in the front-rear direction, an annular member 104 surrounding the bush attachment hole 102, and an attachment groove 106 defined in the front surface of the annular member 104. A ring bush 108 is attached to the bush attachment hole 102. An O-ring 110 is attached to the attachment groove 106. Washers 112, 114 are attached to the bolt 86. The washer 112 is disposed between the head of the bolt 86 and the annular member 104. The washer 114 is disposed between the slide plate 40 and the nut 88. An externally threaded portion of the bolt 86 extends through the washer 112, the ring bush 108, a through hole 116 defined in the slide plate 40, and the washer 114, and then is screwed in an internally threaded portion of the nut 88. The bolt 86 and the nut 88 fasten the slide plate 40 and the annular member 104 of the fastening portion 90 together via the washers 112, 114. The O-ring 110 is pressed between the washer 112 and the annular member 104.

Figure 9:
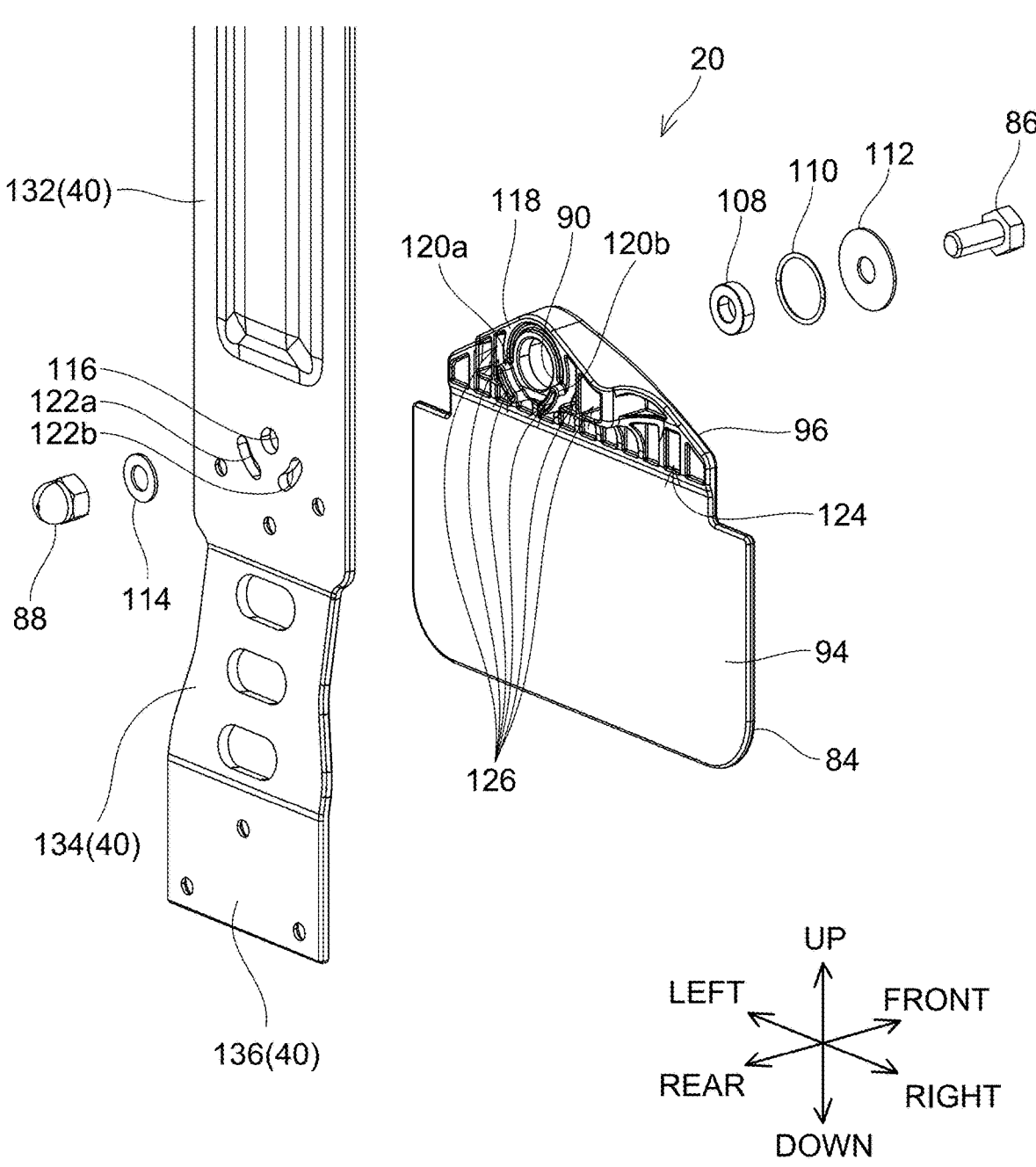
FIG. 9 shows an exploded view of the structure around the connection mechanism 20 of the backpack type assembly 2 according to the embodiment.

As shown in FIG. 9, the elastic member 84 further includes a contact surface 118 configured to contact the front surface of the slide plate 40 and guide projections 120a, 120b projecting rearward from the contact surface 118. The guide projections 120a, 120b are inserted in a guide holes 122a, 122b defined in the slide plate 40. In the state where the guide projections 120a, 120b are inserted in the guide holes 122a, 122b, the elastic member 84 is prohibited from moving in the up-down direction and in the left-right direction relative to the slide plate 40. The connection portion 96 includes a plurality of ribs 124 projecting rearward from the rear surface of the connection portion 96. The connection portion 96 also includes a plurality of lightening recesses 126 recessed forward from the contact surface 118 (and rear surfaces of the guide projections 120a, 120b).

Figure 10:
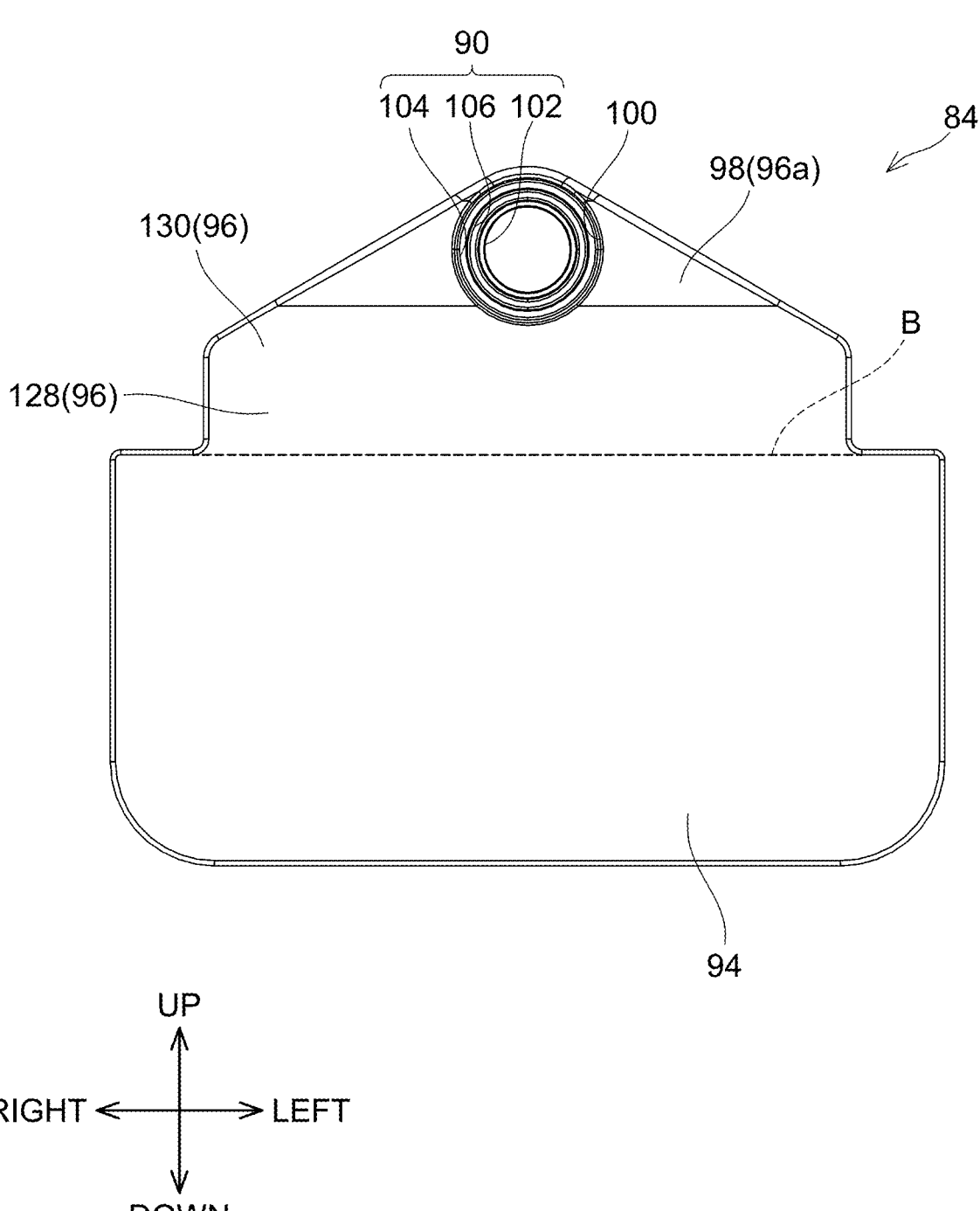
FIG. 10 shows a front view of an elastic member 84 of the backpack type assembly 2 according to the embodiment.

As shown in FIG. 10, in the front view, the plate portion 94 has a substantially rectangular shape with its longitudinal direction along the left-right direction and its short direction along the up-down direction. The lower end of the connection portion 96 is connected to a part of the upper end of the plate portion 94. In FIG. 10, a border B between the plate portion 94 and the connection portion 96 is shown by a dotted line for the sake of convenience. The border B can be regarded as a part of the upper end of the plate portion 94 and also as the lower end of the connection portion 96. The connection portion 96 includes a constant width portion 128 that has a substantially constant width in the left-right direction and extends in the up-down direction and a reduced width portion 130 that is connected to the upper end of the constant width portion 128 and has a width in the left-right direction that decreases as the distance from the upper end of the constant width portion 128 increases. In the front view, the constant width portion 128 has a substantially rectangular shape with its longitudinal direction along the left-right direction and its short direction along the up-down direction. In the front view, the reduced width portion 130 has a substantially triangular shape with an apex at its upper end. The width of the connection portion 96 in the left-right direction decreases monotonically as the distance from the upper end of the plate portion 94 increases.

Figure 11:
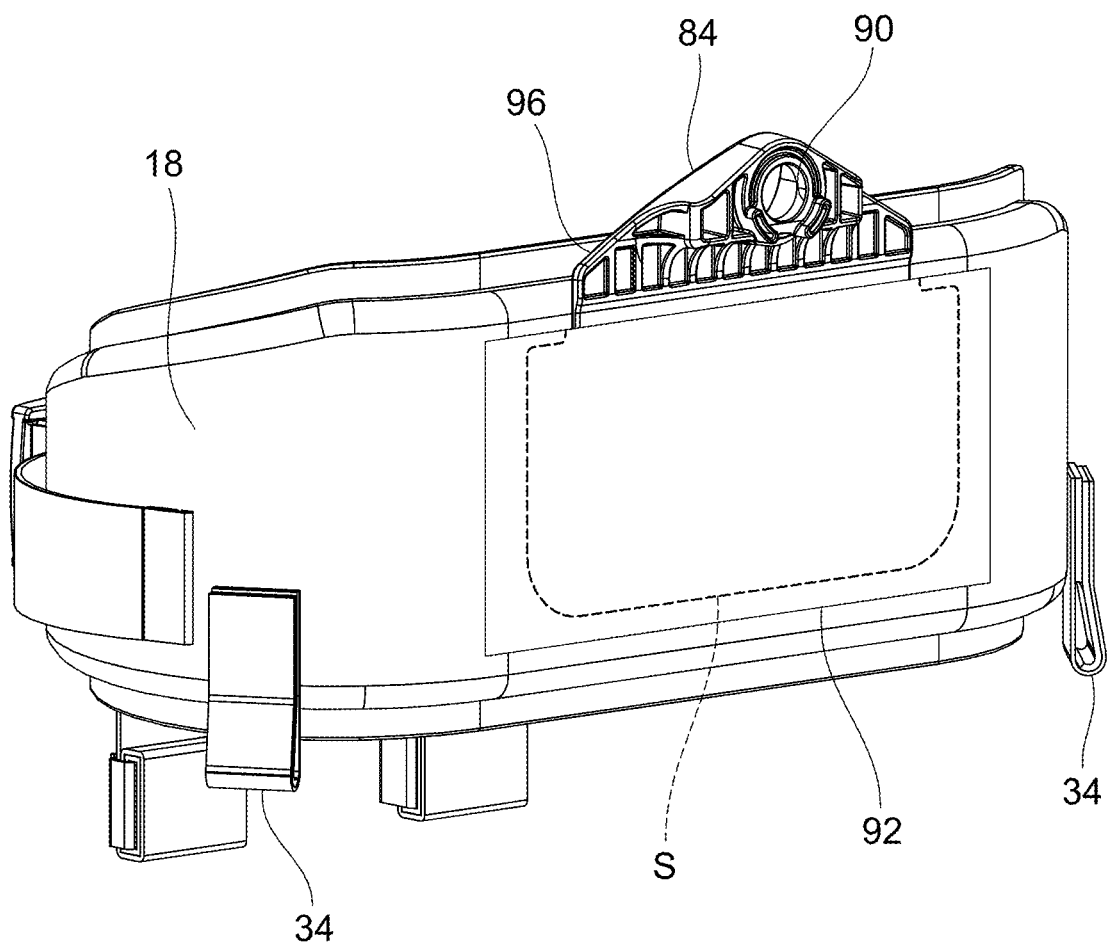
FIG. 11 shows the elastic member 84 being attached to a waist belt 18 of the backpack type assembly 2 according to the embodiment.
Figure 11:
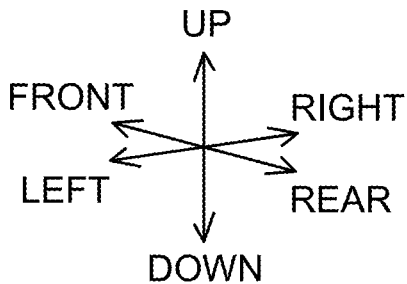

As shown in FIG. 11, the pocket 92 is configured to cover the entire plate portion 94 (see FIG. 10) and is sewn to the waist belt 18 along a sewing line S. The sewing line S surrounds a part of the upper end of the plate portion 94 excluding the border B, the left end of the plate portion 94, the right end of the plate portion 94, and the lower end of the plate portion 94. Thus, the pocket 92 pushes the plate portion 94 against the waist belt 18 and also prohibits the plate portion 94 from moving in the front-rear direction, the up-down direction, and the left-right direction relative to the waist belt 18. Therefore, the plate portion 94 is attached to the waist belt 18 such that its orientation does not change relative to the waist belt 18.

The connection portion 96 of the elastic member 84 has a flexural rigidity smaller than that of the back plate 12 (the back plate body 36, the strap attachment plate 38, the slide plate 40, the upper engagement member 42, and the lower engagement member 44). Thus, when the user wearing the assembly 2 assumes a posture different from the upright posture (e.g., a stooped posture, a backbend posture, twisted posture, etc.), the connection portion 96 of the elastic member 84 deforms so that the back plate 12 and the waist belt 18 move following the user's posture change. The flexural rigidity herein means, for example, a flexural rigidity against a flexure about an axis extending in the left-right direction.

As shown in FIG. 7, the slide plate 40 includes a body portion 132 extending in the up-down direction, an inclined portion 134 extending rearward and downward from the lower end of the body portion 132, and an offset portion 136 extending downward from the lower end of the inclined portion 134. The body portion 132 is inserted in the sleeve portion 62 (see FIG. 3), and the fastening portion 90 (see FIG. 8) is fastened thereto. The inclined portion 134 faces the plate portion 94 (see FIG. 8) of the elastic member 84 in the front-rear direction. The inclined portion 134 is inclined to be farther away from the plate portion 94 at its portions closer to its lower end. A plurality of lightening holes 138 (see FIG. 3) is defined in the inclined portion 134 to reduce the weight of the slide plate 40. The offset portion 136 is offset rearward from the rear surface of the body portion 132 and extends substantially parallel to the body portion 132. In a side view, a portion of the slide plate 40 below the lower end of the fastening portion 90 has a rearwardly warped shape. This allows the waist belt 18 to be less likely to contact the slide plate 40 even when the waist belt 18 moves rearward from its position shown in FIG. 7.

Features of Stand Member 10

Figure 12:
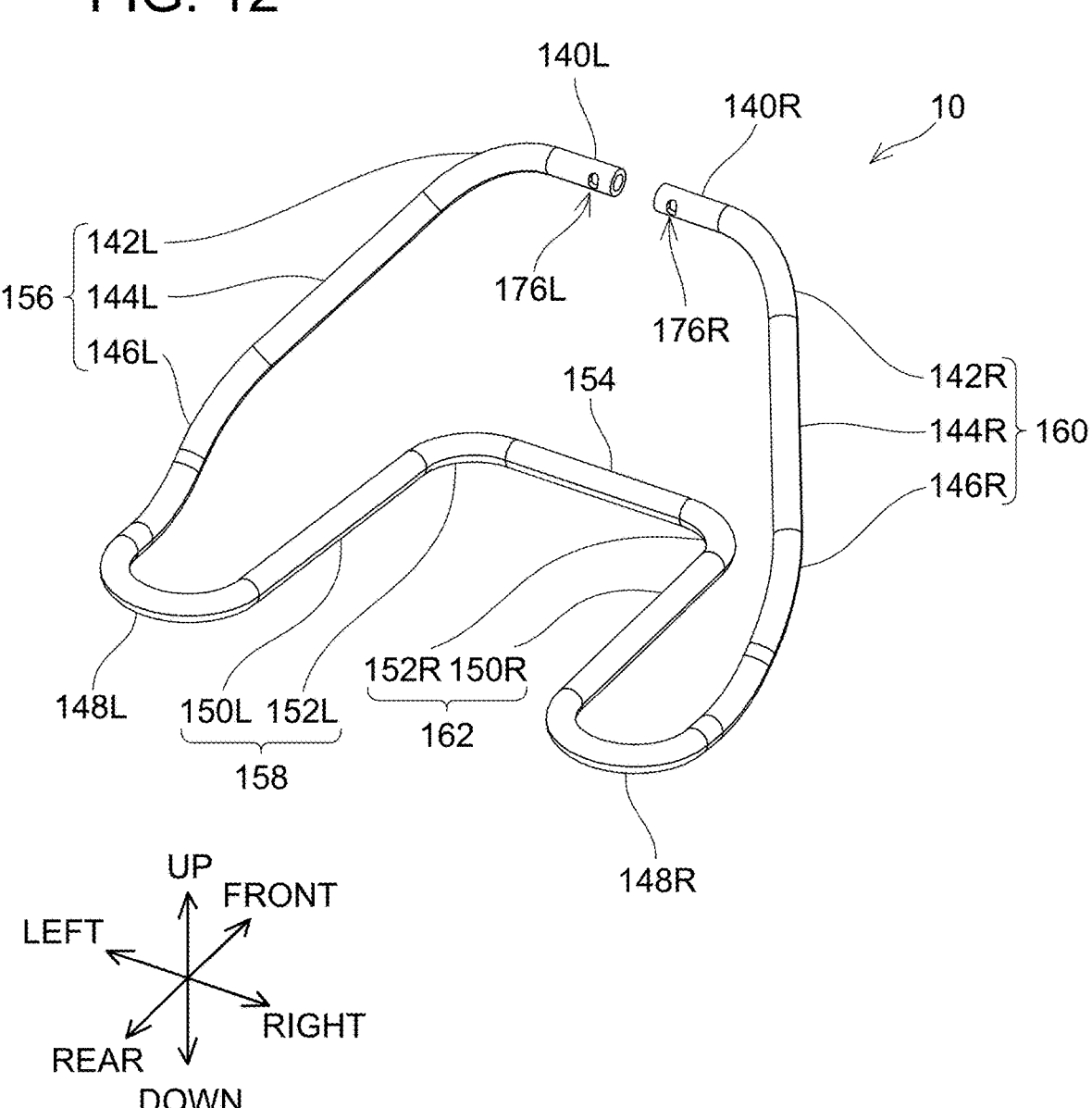
FIG. 12 shows the stand member 10 of the backpack type assembly 2 according to the embodiment, as viewed from the upper rear right side.

As shown in FIG. 12, the stand member 10 is formed by bending a single hollow pipe. A metal material (e.g., aluminum alloy) is used for the stand member 10. The stand member 10 includes a first upper coupling portion 140L extending leftward from one end of the hollow pipe; a curved portion 142L connected to the left end of the first upper coupling portion 140L and extending leftward, rearward, and downward to curve from the left end of the first upper coupling portion 140L; a straight portion 144L connected to the lower end of the curved portion 142L and extending substantially straight in the direction in which the lower end of the curved portion 142L is oriented (rearward, downward, and leftward); a curved portion 146L connected to the lower end of the straight portion 144L and extending rearward and downward to curve from the lower end of the straight portion 144L; a left bent portion 148L connected to the lower end of the curved portion 146L and having a U-shape open forward and upward; a straight portion 150L connected to the right front end of the left bent portion 148L and extending substantially straight in the direction in which the right front end of the left bent portion 148L is oriented (forward and upward); a curved portion 152L connected to the front end of the straight portion 150L and extending forward and rightward to curve from the front end of the straight portion 150L; a lower coupling portion 154 connected to the right end of the curved portion 152L and extending in the left-right direction; a curved portion 152R connected to the right end of the lower coupling portion 154 and extending rightward, rearward, and downward to curve from the right end of the lower coupling portion 154; a straight portion 150R connected to the rear end of the curved portion 152R and extending substantially straight in the direction in which the rear end of the curved portion 152R is oriented (rearward and downward); a right bent portion 148R connected to the rear end of the straight portion 150R and having a U-shape open forward and upward; a curved portion 146R connected to the right front end of the right bent portion 148R and extending leftward, forward, and upward to curve from the right front end of the right bent portion 148R; a straight portion 144R connected to the front end of the curved portion 146R and extending substantially straight in the direction in which the front end of the curved portion 146R is oriented (forward, upward, leftward); a curved portion 142R connected to the upper end of the straight portion 144R and extending forward and leftward to curve from the front end of the straight portion 144R; and a second upper coupling portion 140R connected to the left end of the curved portion 142R, extending leftward, and including the other end of the hollow pipe. The left portions 140L, 142L, 144L, 146L, 148L, 150L, 152L of the stand member 10 and the right portions 140R, 142R, 144R, 146R, 148R, 150R, 152R of the stand member 10 are mirror symmetric with respect to a plane extending in the front-rear direction and the left-right direction.

In this embodiment, the first upper coupling portion 140L and the second upper coupling portion 140R may be collectively termed "upper coupling portions 140L, 140R"; the curved portion 142L, the straight portion 144L, and the curved portion 146L may be collectively termed a "first extension portion 156"; the straight portion 150L and the curved portion 152L may be collectively termed a "second extension portion 158"; the curved portion 142R, the straight portion 144R, and the curved portion 146R may be collectively termed a "third extension portion 160"; and the straight portion 150R and the curved portion 152R may be collectively termed a "fourth extension portion 162".

Figure 13:
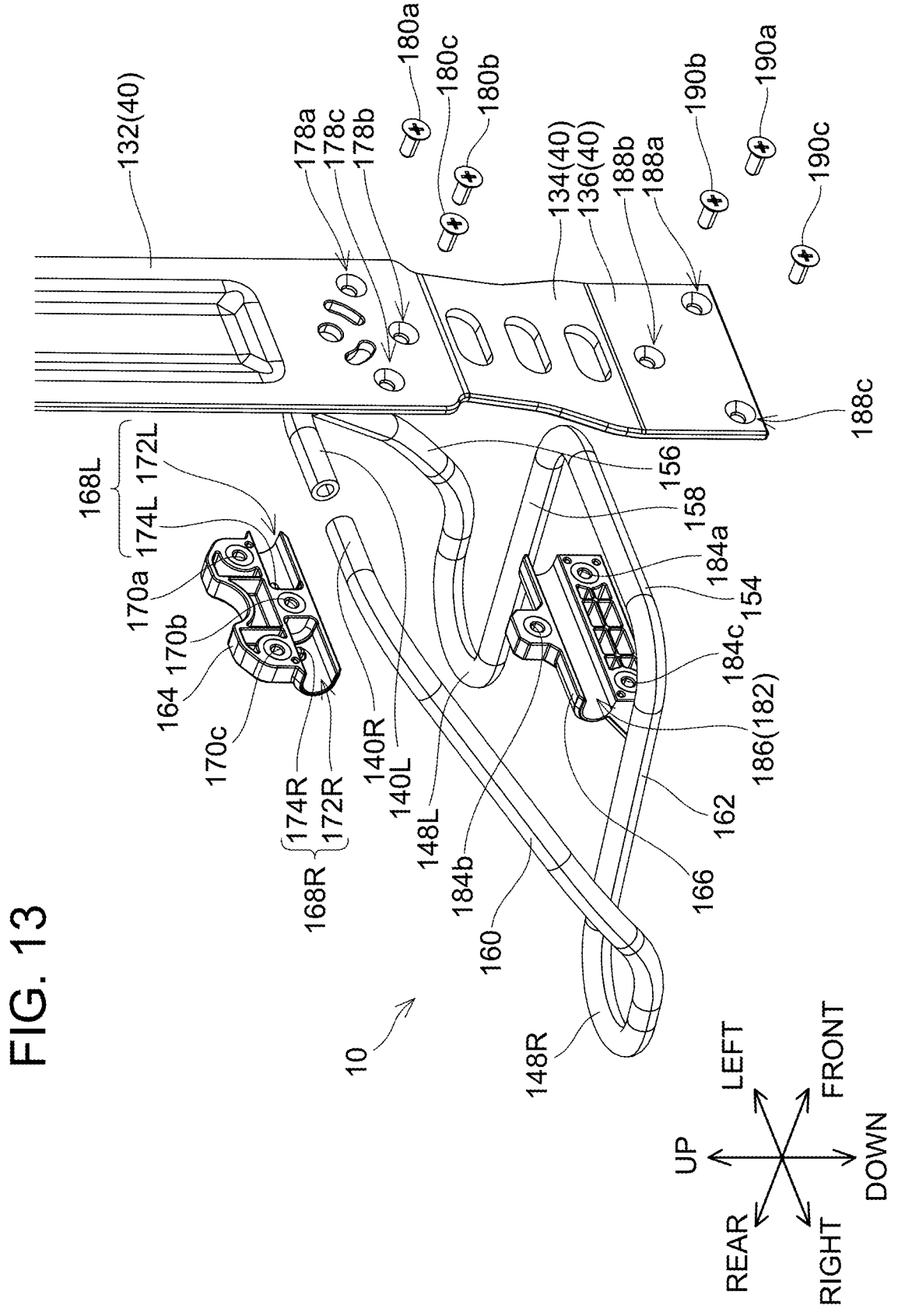
FIG. 13 shows an exploded view of a structure around the stand member 10 of the backpack type assembly 2 according to the embodiment.

As shown in FIG. 13, the stand member 10 is attached to the slide plate 40 in a non-rotatable manner via an upper coupling member 164 and a lower coupling member 166.

The upper coupling member 164 includes a support portions 168L, 168R and threaded hole portions 170a, 170b, 170c. The support portion 168L includes a groove 172L that extends rightward from the left end of the upper coupling member 164 and is open forward and a positioning pin 174L projecting forward from the bottom surface of the groove 172L. The support portion 168R includes a groove 172R that extends leftward from the right end of the upper coupling member 164 and is open forward and a positioning pin 174R projecting forward from the bottom surface of the groove 172R. The grooves 172L, 172R receive the upper coupling portions 140L, 140R of the stand member 10. The bottom surfaces of the grooves 172L, 172R are semicircular surfaces corresponding to the outer circumferential surfaces of the upper coupling portions 140L, 140R. The positioning pins 174L, 174R are inserted in positioning holes 176L, 176R (see FIG. 12) defined in the upper coupling portions 140L, 140R. In the state where the positioning pins 174L, 174R are in the positioning holes 176L, 176R, the upper coupling portions 140L, 140R are prohibited from moving in the extension direction of the grooves 172L, 172R (in the left-right direction). Further, through holes 178a, 178b, 178c are defined in the body portion 132 of the slide plate 40 so as to be aligned with the threaded hole portions 170a, 170b, 170c, respectively. The upper coupling member 164 is fixed to the slide plate 40 by inserting screws 180a, 180b, 180c into the through holes 178a, 178b, 178c and then screwing the screws 180a, 180b, 180c to the threaded hole portions 170a, 170b, 170c. In the state where the upper coupling member 164 has been fixed to the slide plate 40, the upper coupling portions 140L, 140R are interposed between the upper coupling member 164 and the slide plate 40. Thus, the upper coupling portions 140L, 140R are coupled to the slide plate 40.

The lower coupling member 166 includes a support portion 182 and threaded hole portions 184a, 184b, 184c. The support portion 182 includes a groove 186 that extends from the left end of the lower coupling member 166 to the right end thereof and is open forward. The groove 186 receives the lower coupling portion 154 of the stand member 10. The bottom surface of the groove 186 is a semicircular surface corresponding to the outer circumferential surface of the lower coupling portion 154. Further, through holes 188a, 188b, 188c are defined in the offset portion 136 of the slide plate 40 so as to be aligned with the threaded hole portions 184a, 184b, 184c. The lower coupling member 166 is fixed to the slide plate 40 by inserting screws 190a, 190b, 190c in the through holes 188a, 188b, 188c and then screwing the screws 190a, 190b, 190c to the threaded hole portions 184a, 184b, 184c. In the state where the lower coupling member 166 has been fixed to the slide plate 40, the lower coupling portion 154 is interposed between the lower coupling member 166 and the slide plate 40. Thus, the lower coupling portion 154 is coupled to the slide plate 40.

Figure 14:
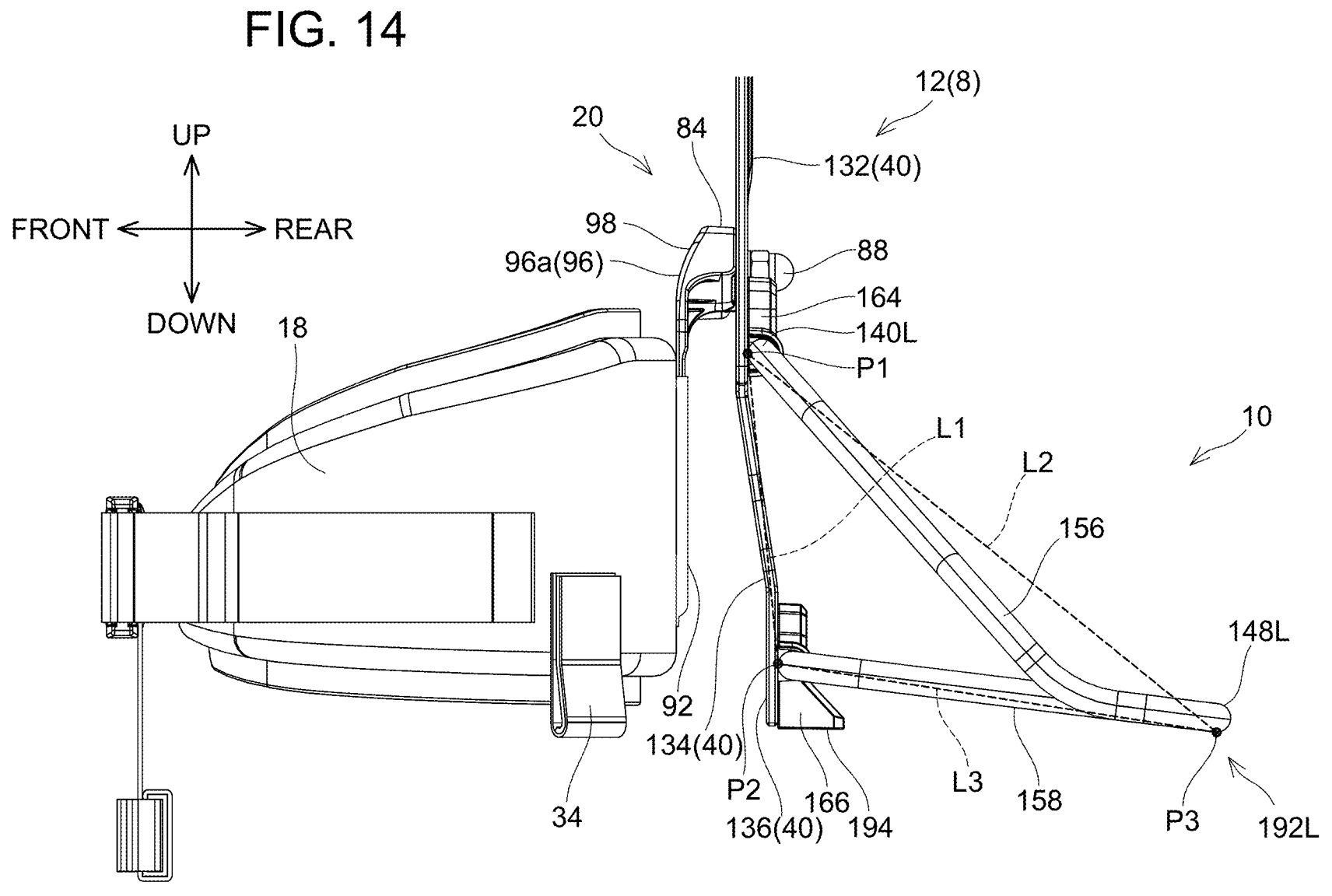

As shown in FIGS. 7 and 14, the stand member 10 further includes a left foot portion 192L and a right foot portion 192R. The left foot portion 192L is located on the lower surface of the left bent portion 148L. The right foot portion 192R is located on the lower surface of the right bent portion 148R. The lower coupling member 166 includes an end surface 194 parallel to the front-rear direction and the left-right direction. The end surface 194 is positioned below the lower end of the slide plate 40. In this embodiment, when the assembly 2 is vertically viewed from above while the left foot portion 192L, the right foot portion 192R, and the end surface 194 are in contact with a placement surface (e.g., ground), the center of gravity of the assembly 2 overlaps a support base plane defined by the left foot portion 192L, the right foot portion 192R, and the end surface 194, regardless of the locking position of the slide plate 40 relative to the back plate body 36. The user can thus place the assembly 2 on the placement surface by bringing the left foot portion 192L, the right foot portion 192R, and the end surface 194 into contact with the placement surface. The support base plane herein means a substantially triangular plane having apexes at three points, namely the left foot portion 192L, the right foot portion 192R, and the end surface 194.

Figure 15:
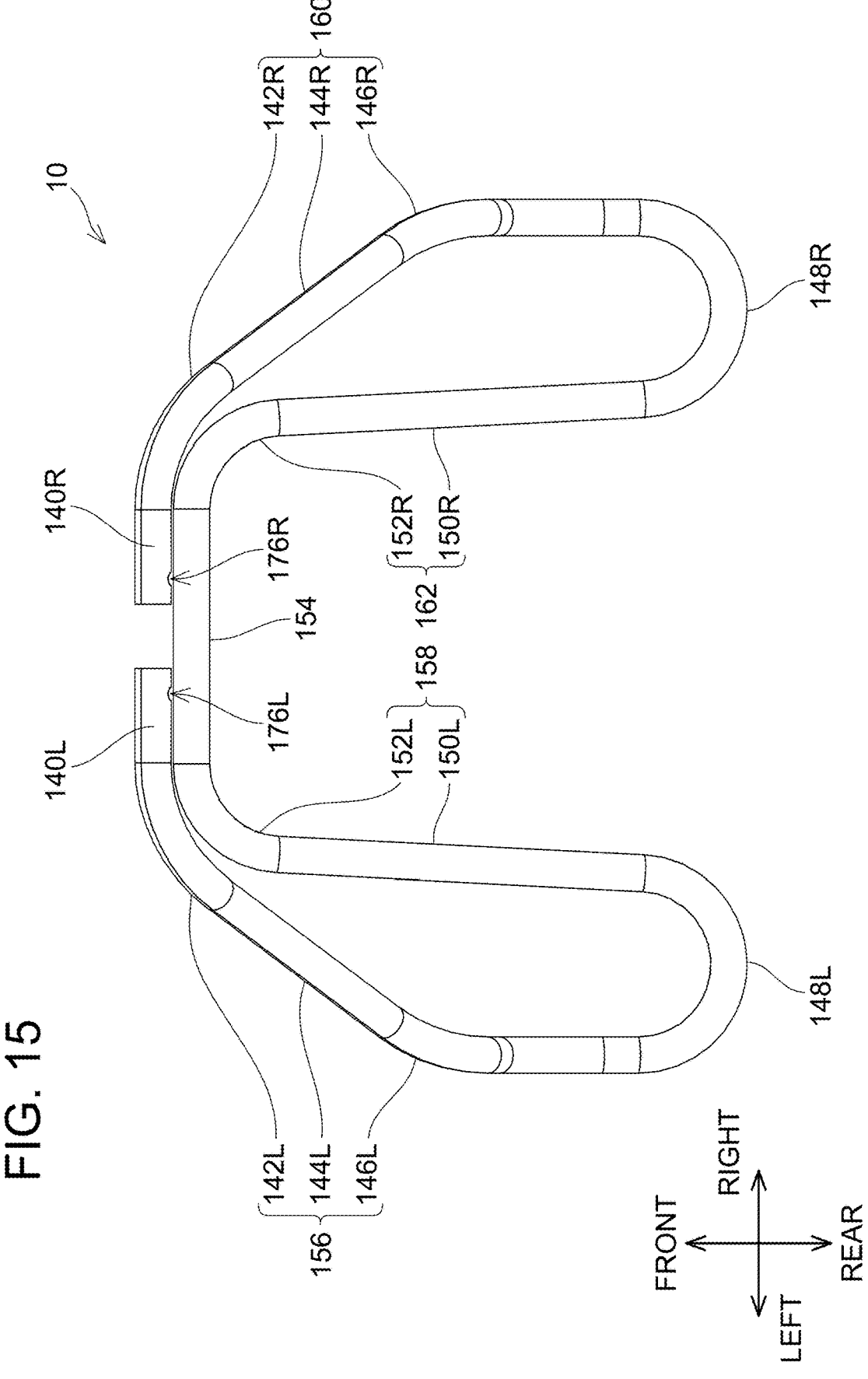
FIG. 15 shows a top view of the stand member 10 of the backpack type assembly 2 according to the embodiment.

As shown in FIG. 15, in the top view, the upper coupling portions 140L, 140R are offset forward from the lower coupling portion 154. In the top view, the first extension portion 156 is offset leftward from the second extension portion 158. In the top view, the third extension portion 160 is offset rightward from the fourth extension portion 162.

FIG. 14 shows a position P1 of the front ends of the upper coupling portions 140L, 140R in the left side view, a position P2 of the front end of the lower coupling portion 154 in the left side view, and a position P3 of the lower end of the left foot portion 192L in the left side view. In the left side view, the distance between the position P1 and the position P2 is for example in the range from 40 mm to 130 mm, and in this embodiment, it is approximately 108 mm. Further, in the left side view, the angle formed by a straight line L1 connecting the position P1 and the position P2 and a straight line L3 connecting the position P2 and the position P3 is for example 90 degrees or more, and in this embodiment, it is approximately 104 degrees. Moreover, in the left side view, the angle formed by the straight line L3 and a straight line L2 connecting the position P1 and the position P3 is for example 16 degrees or more, and in this embodiment, it is approximately 31 degrees.

FIG. 7 shows a position P4 of the front ends of the upper coupling portions 140L, 140R in the right side view, a position P5 of the front end of the lower coupling portion 154 in the right side view, and a position P6 of the lower end of the right foot portion 192R in the right side view. In the right side view, the distance between the position P4 and the position P5 is for example in the range from 40 mm to 130 mm, and in this embodiment, it is approximately 108 mm. Further, in the right side view, the angle formed by a straight line L4 connecting the position P4 and the position P5 and a straight line L6 connecting the position P5 and the position P6 is for example 90 degrees or more, and in this embodiment, it is approximately 104 degrees. Moreover, in the right side view, the angle formed by the straight line L6 and a straight line L5 connecting the position P4 and the position P6 is for example 16 degrees or more, and in this embodiment, it is approximately 31 degrees.

Variants

A device or a load other than the power supply 6 may be attached to the carrier 4. For example, a basket configured to accommodate an object, a tank configured to store a liquid, or a working machine the user can use may be attached to the carrier 4. The working machine herein may be for example a blower, a grass cutter, a hedge trimmer, a chainsaw, a cleaner, or a sprayer.

The stand member 10 may not be formed by bending a single rod-shaped member. The stand member 10 may for example be formed by connecting multiple rod-shaped members together.

A solid material may be used for the stand member 10, instead of using a hollow pipe.

The stand member 10 may be coupled to a part of the carrier body 8 excluding the slide plate 40 (e.g., to the rear surface of the waist belt 18).

The way to couple the stand member 10 to the carrier body 8 may be modified as needed. For example, the stand member 10 may be welded to the slide plate 40.

The shape of the stand member 10 may be modified as needed. The left bent portion 148L may be bent in V-shape. The right bent portion 148R may be bent in V-shape. In the top view, the upper coupling portions 140L, 140R may be offset rearward from the lower coupling portion 154. In the top view, the first extension portion 156 may be offset rightward from the second extension portion 158. In the top view, the third extension portion 160 may be offset leftward from the fourth extension portion 162. The angle formed by the straight line L1 and the straight line L3 may be less than 90 degrees. The angle formed by the straight line L3 and the straight line L2 may be less than 16 degrees. The angle formed by the straight line L4 and the straight line L6 may be less than 90 degrees. The angle formed by the straight line L6 and the straight line L5 may be less than 16 degrees.

The lower end of the lower coupling member 166 (i.e., the end surface 194) may be positioned above the lower end of the slide plate 40. In this case, the assembly 2 may be placed on the placement surface by bringing the left foot portion 192L, the right foot portion 192R, and the lower end of the slide plate 40 into contact with the placement surface.

The back plate body 36 and the slide plate 40 may be replaced by a single plate material. In this case, the power supply 6, the stand member 10, and the connection mechanism 20 may each be attached to this plate material. The position of the waist belt 18 relative to this plate material may be unchangeable.

A material other than the plastic material may be used for the elastic member 84. For example, a rubber material may be used for the elastic member 84.

The elastic member 84 may be a spring interposed between the waist belt 18 and the slide plate 40 so as to be pressed and contracted therebetween. In this case, a metal material may be used for the elastic member 84 (i.e., spring).

The way to attach the plate portion 94 to the waist belt 18 may be modified as needed. For example, the plate portion 94 may be riveted to the waist belt 18.

The shape of the elastic member 84 may be modified as needed. The fastening portion 90 may be positioned below the upper end of the plate portion 94. The front surface 96a of the connection portion 96 may extend along the imaginary plane V. In the front view, the width of the connection portion 96 in the left-right direction may not monotonically decrease. The connection portion 96 may not include the recess 100. The elastic member 84 may not include the guide projections 120a, 120b.

In a side view, the slide plate 40 may not have the rearwardly warped shape. That is, the slide plate 40 may extend linearly between its upper and lower ends.

Features of Embodiments

In one or more embodiments, the backpack type assembly 2 comprises the backpack type carrier 4 configured to be worn by the user and the power supply 6 (an example of device) configured to be attached to the backpack type carrier 4. The backpack type carrier 4 comprises a pair of shoulder straps 14, 16 configured to be worn on both shoulders of the user, the back plate 12 to which the pair of shoulder straps 14, 16 and the power supply 6 are attached, the waist belt 18 configured to be wrapped around the waist of the user, and the connection mechanism 20 configured to connect between the back plate 12 and the waist belt 18. The connection mechanism 20 comprises the elastic member 84 having a flexural rigidity smaller than the flexural rigidity of the back plate 12. A force applied to the connection mechanism 20 from one of the back plate 12 and the waist belt 18 is transmitted through the elastic member 84 to the other of the back plate 12 and the waist belt 18.

In one or more embodiments, the backpack type carrier 4 is configured to be worn by the user to carry the power supply 6 (an example of object). The backpack type carrier 4 comprises a pair of shoulder straps 14, 16 configured to be worn on both shoulders of the user, the back plate 12 to which the pair of shoulder straps 14, 16 is attached and the power supply 6 is detachably attached, the waist belt 18 configured to be wrapped around the waist of the user, and the connection mechanism 20 configured to connect between the back plate 12 and the waist belt 18. The connection mechanism 20 comprises the elastic member 84 having a flexural rigidity smaller than the flexural rigidity of the back plate 12. A force applied to the connection mechanism 20 from one of the back plate 12 and the waist belt 18 is transmitted through the elastic member 84 to the other of the back plate 12 and the waist belt 18.

In the configuration above, the elastic member 84 deforms when the user changes his/her posture, so that the back plate 12 and the waist belt 18 move following the change in the user's posture. When the user assumes a stooped posture, the back plate 12 is moved away from the waist belt 18 by an elastic restoring force of the elastic member 84. Specifically, the back plate 12 is moved away from the waist belt 18 on fulcrums near the shoulders of the user. This increases a load on the shoulders of the user but reduces a load on the lower back of the user. Therefore, the configuration above can reduce a strain on the lower back of the user wearing the backpack type assembly 2 (or the carrier 4).

In one or more embodiments, the elastic member 84 is disposed forward of the front surface of the back plate 12.

According to the configuration above, the elastic member 84 is positioned forward of the front surface of the back plate 12, and thus the back plate 12 is separated rearward from the waist belt 18 by the elastic member 84. This provides a clearance between the back of the user and the back plate 12, thereby improving airflow between the back of the user and the back plate 12.

In one or more embodiments, the elastic member 84 comprises the plate portion 94 extending along the rear surface of the waist belt 18 and attached to the waist belt 18 such that its orientation relative to the waist belt 18 does not change, the fastening portion 90 disposed rearward of the rear surface of the plate portion 94 and configured to be fastened to the front surface of the back plate 12 by the bolt 86 and the nut 88 (an example of a predetermined fastener), and the connection portion 96 connecting between the plate portion 94 and the fastening portion 90.

In the configuration above, the back plate 12 is separated rearward from the waist belt 18 by the elastic member 84. This provides a clearance between the back of the user and the back plate 12, thereby improving airflow between the back of the user and the back plate 12.

In one or more embodiments, the fastening portion 90 is disposed above the upper end of the plate portion 94.

The configuration above provides a larger clearance between the back of the user and the back plate 12 than a clearance therebetween provided by a configuration where the fastening portion 90 is disposed below the upper end of the plate portion 94. Therefore, the effect of improving airflow between the back of the user and the back plate 12 is more remarkable.

In one or more embodiments, the connection portion 96 comprises the front surface 96a (an example of connection surface) connected to the front surface of the plate portion 94 and extending upward from the upper end of the plate portion 94. The front surface 96a of the connection portion 96 comprises the curved surface 98 curving away from the imaginary plane V, which is an imaginary extension of the front surface of the plate portion 94. The curved surface 98 curves farther away from the imaginary plane V at its portions farther away from the upper end of the plate portion 94.

Since the fastening portion 90 is disposed above the upper end of the plate portion 94, the connection portion 96 may protrude upward beyond the upper end of the waist belt 18. In this case, the front surface 96a of the connection portion 96 may contact the lower back or back of the user while the user is using the backpack type assembly 2, which may make the user feel uncomfortable. According to the configuration above, the front surface 96a of the connection portion 96 includes the curved surface that curves farther rearward at its portions farther away from the upper end of the plate portion 94. Thus, the front surface 96a of the connection portion 96 is less likely to contact the lower back or back of the user. Therefore, the user is less likely to feel the uncomfortableness.

In one or more embodiments, in the front view, the width of the front surface 96a of the connection portion 96 in the left-right direction decreases monotonically as the distance from the upper end of the plate portion 94 increases.

If the width of the front surface 96a of the connection portion 96 in the left-right direction increases monotonically as the distance from the upper end of the plate portion 94 increases, a sufficient space to place components other than the elastic member 84 may not be secured. According to the configuration above, the width of the front surface 96a of the connection portion 96 in the left-right direction decreases monotonically as the distance from the upper end of the plate portion 94 increases, and thus a sufficient space can be secured to place components other than the elastic member 84.

In one or more embodiments, the connection portion 96 further comprises the recess 100 recessed rearward from the front surface 96a of the connection portion 96. The fastening portion 90 is disposed at the bottom of the recess 100.

The configuration above allows the bolt 86 to be positioned within the recess 100. This prevents the user from accidentally touching the bolt 86.

In one or more embodiments, the elastic member 84 further comprises the contact surface 118 contacting the front surface of the back plate 12 and the guide projections 120a, 120b projecting rearward from the contact surface 118. The back plate 12 comprises the guide holes 122a, 122b receiving the guide projections 120a, 120b.

The configuration above prevents the elastic member 84 from moving in the up-down direction and in the left-right direction relative to the back plate 12. Thus, the elastic member 84 can be fixed in position relative to the back plate 12 in the up-down direction and the left-right direction.

In one or more embodiments, in a side view, a portion of the back plate 12 below the lower end of the fastening portion 90 is warped rearward.

While the user is using the backpack type assembly 2, the waist belt 18 may move rearward and contact the back plate 12, which may make the user wearing the backpack type assembly 2 feel uncomfortable. According to the configuration above, the back plate 12 is warped rearward, and thus the waist belt 18 is less likely to contact the back plate 12. This prevents the user from feeling the uncomfortableness.

In one or more embodiments, the back plate 12 comprises the back plate body 36 to which the power supply 6 is detachably attached, the slide plate 40 (an example of support plate) connected to the waist belt 18 via the connection mechanism 20 and configured to be movable in the up-down direction relative to the back plate body 36, and the locking mechanism 68 configured to fix a position of the slide plate 40 relative to the back plate body 36 in the up-down direction.

The configuration above allows the user to adjust the position of the waist belt 18 relative to the back plate body 36 by changing the position of the slide plate 40 relative to the back plate body 36.

In one or more embodiments, the device is the power supply 6 including a plurality of rechargeable secondary battery cells.

The configuration above allows the user to carry the power supply 6 on his/her back to various places. Thus, the user can carry the power supply 6 to a place where connection to a commercial power supply is impossible and use an electronic device by supplying electric power to the electronic device from the power supply 6.

In one or more embodiments, the backpack type assembly 2 comprises the backpack type carrier 4 configured to be worn by a user and the power supply 6 (an example of device) configured to be attached to the backpack type carrier 4. The backpack type carrier 4 comprises the backpack type carrier body 8 (back plate 12) to which the power supply 6 is attached and including a pair of shoulder straps 14, 16 configured to be worn on both shoulders of the user and the stand member 10 attached to the backpack type carrier body 8 (back plate 12) in a non-rotatable manner. The stand member 10 comprises the upper coupling portions 140L, 140R coupled to the backpack type carrier body 8 (back plate 12), the lower coupling portion 154 coupled to the backpack type carrier body 8 (back plate 12) below the upper coupling portions 140L, 140R, the left foot portion 192L positioned rearward and leftward of the backpack type carrier body 8 (back plate 12), and the right foot portion 192R positioned rearward and rightward of the backpack type carrier body 8 (back plate 12). The backpack type assembly 2 is configured to be placed on the placement surface by bringing the end surface 194 (an example of lower part of the backpack type carrier body), the left foot portion 192L, and the right foot portion 192R into contact with the placement surface.

In one or more embodiments, the backpack type carrier 4 is configured to be worn by a user for carrying the power supply 6 (an example of object). The backpack type carrier 4 comprises the backpack type carrier body 8 (back plate 12) to which the power supply 6 is detachably attached and including a pair of shoulder straps 14, 16 configured to be worn on both shoulders of the user and the stand member 10 attached to the backpack type carrier body 8 (back plate 12) in a non-rotatable manner. The stand member 10 comprises the upper coupling portions 140L, 140R coupled to the backpack type carrier body 8 (back plate 12), the lower coupling portion 154 coupled to the backpack type carrier body 8 (back plate 12) below the upper coupling portions 140L, 140R, the left foot portion 192L positioned rearward and leftward of the backpack type carrier body 8 (back plate 12), and the right foot portion 192R positioned rearward and rightward of the backpack type carrier body 8 (back plate 12). The backpack type carrier 4 is configured to be placed on the placement surface by bringing the end surface 194 (an example of lower part of the backpack type carrier body), the left foot portion 192L, and the right foot portion 192R into contact with the placement surface in the state of having the power supply 6 attached to the backpack type carrier body 8.

According to the configurations above, the stand member 10 is not rotatable relative to the backpack type carrier body 8 (back plate 12) and the stand member 10 is coupled to the backpack type carrier body 8 (back plate 12) at at least two points in the up-down direction. This relatively stabilizes the orientation of the stand member 10 relative to the backpack type carrier body 8 (back plate 12). Therefore, even when the backpack type assembly 2 (or the backpack type carrier 4) experiences an impact and/or vibration while placed on the placement surface, the orientation of the stand member 10 does not change easily. Thus, the configurations above provide the backpack type assembly 2 (or the backpack type carrier 4) that is less likely to fall when placed on the placement surface.

In one or more embodiments, the stand member 10 further comprises the first extension portion 156 having a rod shape and extending between the left foot portion 192L and the upper coupling portions 140L, 140R, the second extension portion 158 having a rod shape and extending between the left foot portion 192L and the lower coupling portion 154, the third extension portion 160 having a rod shape and extending between the right foot portion 192R and the upper coupling portions 140L, 140R, and the fourth extension portion 162 having a rod shape and extending between the right foot portion 192R and the lower coupling portion 154.

When the backpack type assembly 2 is on the placement surface, the stand member 10 receives a force from each of the placement surface and the backpack type carrier body 8 (back plate 12). Depending on the shape of the stand member 10, the stand member 10 may be subjected to large local stress. The configuration above allows the forces the stand member 10 receives from the placement surface and the backpack type carrier body 8 (back plate 12) to distribute in a balanced manner to the first extension portion 156, the second extension portion 158, the third extension portion 160, and the fourth extension portion 162. This prevents the stand member 10 from being subjected to large local stress.

In one or more embodiments, in the top view, the first extension portion 156 is offset leftward from the second extension portion 158. In the top view, the third extension portion 160 is offset rightward from the fourth extension portion 162.

The configuration above improves visual sturdiness of the stand member 10.

In one or more embodiments, the stand member 10 further comprises the left bent portion 148L having a shape of a rod bent in U-shape and connecting between the first extension portion 156 and the second extension portion 158 and the right bent portion 148R having a shape of a rod bent in U-shape and connecting between the third extension portion 160 and the fourth extension portion 162. The left foot portion 192L is located on the lower surface of the left bent portion 148L. The right foot portion 192R may be located on the lower surface of the right bent portion 148R.

If the left bent portion 148L (or the right bent portion 148R) has a shape of a rod bent in V-shape, the left foot portion 192L (or the right foot portion 192R) has an accordingly pointed shape. This may cause the stand member 10 to lose its balance relative to the placement surface when the backpack type assembly 2 experiences a slight impact and/or vibration while placed on the placement surface, resulting in the backpack type assembly 2 being prone to falling. According to the configuration above, the left bent portion 148L (and the right bent portion 148R) has a shape of a rod bent in U-shape, and thus the left foot portion 192L (or the right foot portion 192R) has a relatively rounded shape accordingly. Thus, the stand member 10 does not lose its balance easily relative to the placement surface even when the backpack type assembly 2 experiences an impact and/or vibration while placed on the placement surface. Therefore, the configuration above provides the backpack type assembly 2 that is more resistant to falling.

In one or more embodiments, the backpack type assembly 2 further comprises the lower coupling member 166 (an example of coupling member) configured to couple the lower coupling portion 154 of the stand member 10 to the backpack type carrier body 8 (back plate 12). The lower coupling member 166 comprises the end surface 194 configured to contact the placement surface when the backpack type assembly 2 is placed on the placement surface.

According to the configuration above, the lower coupling member 166 contacts the placement surface when the backpack type assembly 2 is placed on the placement surface. Thus, there is no need to provide another member that contacts the placement surface when the backpack type assembly 2 is placed thereon. This allows for a reduction in the number of components of the backpack type assembly 2.

In one or more embodiments, the stand member 10 is formed by bending a single rod-shaped member.

For example, the stand member 10 can be formed by connecting multiple rod-shaped members by welding or the like. This, however, takes time and efforts to form the stand member 10. According to the configuration above, the stand member 10 is formed by bending a single rod-shaped member. Therefore, time and efforts to form the stand member 10 can be relatively reduced.

In one or more embodiments, the rod-shaped member is a hollow pipe.

In the configuration above, a hollow pipe is used as the rod-shaped member, and thus the weight of the stand member 10 can be reduced as compared to a configuration where a solid material is used as the rod-shaped member.

In one or more embodiments, the device is the power supply 6 including a plurality of rechargeable secondary battery cells.

The configuration above allows the user to carry the power supply 6 on his/her back to various places. Thus, the user can carry the power supply 6 to a place where connection to a commercial power supply is impossible and use an electronic device by supplying electric power to the electronic device from the power supply 6.

In one or more embodiments, in the left side view, the angle formed by the straight line L1 connecting the upper coupling portion 140L, 140R and the lower coupling portion 154 and the straight line L3 connecting the lower coupling portion 154 and the left foot portion 192L is 90 degrees or more. In the right side view, the angle formed by the straight line L4 connecting the upper coupling portion 140L, 140R and the lower coupling portion 154 and the straight line L6 connecting the lower coupling portion 154 and the right foot portion 192R is 90 degrees or more.

If the upper coupling portion 140L, 140R is offset rearward from the lower coupling portion 154, the center of gravity of the backpack type assembly 2 may be positioned too rearward when the backpack type assembly 2 is placed on the placement surface, depending on the weight and shape of the power supply 6. In this case, a slight rearward tilt of the backpack type assembly 2 may cause it to fall. According to the configuration above, the upper coupling portion 140L, 140R is offset forward from the lower coupling portion 154, and thus the center of gravity of the backpack type assembly 2 is positioned relatively forward when it is placed on the placement surface. This prevents the center of gravity of the backpack type assembly 2 from being positioned too rearward when it is placed on the placement surface. Therefore, the configuration above provides the backpack type assembly 2 that is more resistant to falling.

In one or more embodiments, in the left side view, the angle formed by the straight line L2 connecting the upper coupling portion 140L, 140R and the left foot portion 192L and the straight line L3 connecting the lower coupling portion 154 and the left foot portion 192L is 16 degrees or more. In the right side view, the angle formed by the straight line L5 connecting the upper coupling portion 140L, 140R and the right foot portion 192R and the straight line L6 connecting the lower coupling portion 154 and the right foot portion 192R is 16 degrees or more.

If the backpack type carrier body 8 (back plate 12) deflects too much when the backpack type assembly 2 is placed on the placement surface, the center of gravity of the backpack type assembly 2 may be positioned too rearward. In this case, a slight rearward tilt of the backpack type assembly 2 may cause it to fall. In the configuration above, the distance between the lower coupling portion 154 and the upper coupling portion 140L, 140R is relatively large, and thus the stand member 10 can support the backpack type carrier body 8 (back plate 12) over a larger area. This reduces the deflection of the backpack type carrier body 8 (back plate 12) when the backpack type assembly 2 is placed on the placement surface. Therefore, the configuration above prevents the center of gravity of the backpack type assembly 2 from being positioned too rearward and thus provides the backpack type assembly 2 that is more resistant to falling.

What is claimed is:

1. A backpack type assembly, comprising:
a backpack type carrier configured to be worn by a user; and
a device configured to be attached to the backpack type carrier,
wherein
the backpack type carrier comprises:
a pair of shoulder straps configured to be worn on both shoulders of the user;
a back plate to which the pair of shoulder straps and the device are attached;
a waist belt configured to be wrapped around a waist of the user;
a connection mechanism configured to connect between the back plate and the waist belt,
the connection mechanism comprises an elastic member having a flexural rigidity smaller than a flexural rigidity of the back plate, and
a force applied to the connection mechanism from one of the back plate and the waist belt is transmitted through the elastic member to the other of the back plate and the waist belt,
the elastic member is disposed forward of a front surface of the back plate, the elastic member comprises:
a plate portion extending along a rear surface of the waist belt and attached to the waist belt such that an orientation of the plate portion relative to the waist belt does not change;
a fastening portion disposed rearward of a rear surface of the plate portion and configured to be fastened to the front surface of the back plate by a predetermined fastener; and
a connection portion connecting between the plate portion and the fastening portion, and
the fastening portion is disposed above an upper end of the plate portion.

2. The backpack type assembly according to claim 1, wherein
the elastic member further comprises a contact surface contacting a front surface of the back plate and a guide projection projecting rearward from the contact surface, and
the back plate comprises a guide hole receiving the guide projection.

3. The backpack type assembly according to claim 1, wherein
in a side view, a portion of the back plate below a lower end of the fastening portion is warped rearward.

4. The backpack type assembly according to claim 1, wherein
the back plate comprises:
a back plate body to which the device is detachably attached;
a support plate connected to the waist belt via the connection mechanism and configured to be movable in an up-down direction relative to the back plate body; and
a locking mechanism configured to fix a position of the support plate relative to the back plate body in the up-down direction.

5. The backpack type assembly according to claim 1, wherein the device is a power supply including a plurality of rechargeable battery cells.

6. The backpack type assembly according to claim 1, wherein the connection portion comprises a connection surface connected to a front surface of the plate portion and extending upward from an upper end of the plate portion, the connection surface comprises a curved surface curving away from an imaginary plane that is an imaginary extension of the front surface of the plate portion, the curved surface separating farther away from the imaginary plane at its portions farther away from the upper end of the plate portion, in a front view, a width of the connection surface in a left-right direction decreases monotonically as a distance from the upper end of the plate portion increases, the connection portion further comprises a recess recessed rearward from the connection surface, the fastening portion is disposed at a bottom of the recess, the elastic member further comprises a contact surface contacting a front surface of the back plate and a guide projection projecting rearward from the contact surface, the back plate comprises a guide hole receiving the guide projection, in a side view, a portion of the back plate below a lower end of the fastening portion is warped rearward, the back plate further comprises:

a back plate body to which the device is detachably attached;

a support plate connected to the waist belt via the connection mechanism and configured to be movable in an up-down direction relative to the back plate body; and a locking mechanism configured to fix a position of the support plate relative to the back plate body in the up-down direction, the device is a power supply including a plurality of rechargeable battery cells, the backpack type assembly further comprises a stand member attached to the back plate in a non-rotatable manner, the stand member comprises:

an upper coupling portion coupled to the back plate;

a lower coupling portion coupled to the back plate below the upper coupling portion;

a left foot portion positioned rearward and leftward of the back plate; and a right foot portion positioned rearward and rightward of the back plate, the backpack type assembly is configured to be placed on a placement surface by bringing a lower part of the back plate, the left foot portion, and the right foot portion into contact with the placement surface, the stand member further comprises:

a first extension portion having a rod shape and extending between the left foot portion and the upper coupling portion;

a second extension portion having a rod shape and extending between the left foot portion and the lower coupling portion;

a third extension portion having a rod shape and extending between the right foot portion and the upper coupling portion; and a fourth extension portion having a rod shape and extending between the right foot portion and the lower coupling portion, in a top view, the first extension portion is offset leftward from the second extension portion, in the top view, the third extension portion is offset rightward from the fourth extension portion, the stand member further comprises:

a left bent portion having a shape of a rod bent in U-shape and connecting between the first extension portion and the second extension portion; and a right bent portion having a shape of a rod bent in U-shape and connecting between the third extension portion and the fourth extension portion, the left foot portion is located on a lower surface of the left bent portion, the right foot portion is located on a lower surface of the right bent portion, the backpack type assembly further comprises a coupling member configured to couple the lower coupling portion of the stand member to the back plate, the coupling member comprises an end surface configured to contact the placement surface when the backpack type assembly is placed on the placement surface, the stand member is formed by bending a single rod-shaped member, the rod-shaped member is a hollow pipe, in a left side view, an angle formed by a straight line connecting the upper coupling portion and the lower coupling portion and a straight line connecting the lower coupling portion and the left foot portion is 90 degrees or more, and in a right side view, an angle formed by a straight line connecting the upper coupling portion and the lower coupling portion and a straight line connecting the lower coupling portion and the right foot portion is 90 degrees or more.

7. The backpack type assembly according to claim 1, wherein the connection portion comprises a connection surface connected to a front surface of the plate portion and extending upward from the upper end of the plate portion, and the connection surface comprises a curved surface curving away from an imaginary plane that is an imaginary extension of the front surface of the plate portion, the curved surface separating farther away from the imaginary plane at its portions farther away from the upper end of the plate portion.

8. The backpack type assembly according to claim 7, wherein in a front view, a width of the connection surface in a left-right direction decreases monotonically as a distance from the upper end of the plate portion increases.

9. The backpack type assembly according to claim 7, wherein the connection portion further comprises a recess recessed rearward from the connection surface, and the fastening portion is disposed at a bottom of the recess.

10. A backpack type assembly, comprising:

a backpack type carrier configured to be worn by a user; and a device configured to be attached to the backpack type carrier, wherein the backpack type carrier comprises:

a backpack type carrier body to which the device is attached and including a pair of shoulder straps configured to be worn on both shoulders of the user; and a stand member attached to the backpack type carrier body in a non-rotatable manner, the stand member comprises:

an upper coupling portion coupled to the backpack type carrier body;

a lower coupling portion coupled to the backpack type carrier body below the upper coupling portion;

a left foot portion positioned rearward and leftward of the backpack type carrier body; and a right foot portion positioned rearward and rightward of the backpack type carrier body, the backpack type assembly is configured to be placed on a placement surface by bringing a lower part of the backpack type carrier body, the left foot portion, and the right foot portion into contact with the placement surface, and the stand member further comprises:

a first extension portion having a rod shape and extending between the left foot portion and the upper coupling portion;

a second extension portion having a rod shape and extending between the left foot portion and the lower coupling portion;

a third extension portion having a rod shape and extending between the right foot portion and the upper coupling portion; and a fourth extension portion having a rod shape and extending between the right foot portion and the lower coupling portion.

11. The backpack type assembly according to claim 10, wherein the stand member further comprises:

a left bent portion having a shape of a rod bent in U-shape and connecting between the first extension portion and the second extension portion; and a right bent portion having a shape of a rod bent in U-shape and connecting between the third extension portion and the fourth extension portion, the left foot portion is located on a lower surface of the left bent portion, and the right foot portion is located on a lower surface of the right bent portion.

12. The backpack type assembly according to claim 10, further comprising a coupling member configured to couple the lower coupling portion of the stand member to the backpack type carrier body, wherein the coupling member comprises an end surface configured to contact the placement surface when the backpack type assembly is placed on the placement surface.

13. The backpack type assembly according to claim 10, wherein in a left side view, an angle formed by a straight line connecting the upper coupling portion and the lower coupling portion and a straight line connecting the lower coupling portion and the left foot portion is 90 degrees or more, and in a right side view, an angle formed by a straight line connecting the upper coupling portion and the lower coupling portion and a straight line connecting the lower coupling portion and the right foot portion is 90 degrees or more.

14. The backpack type assembly according to claim 10, wherein in a top view, the first extension portion is offset leftward from the second extension portion, and in the top view, the third extension portion is offset rightward from the fourth extension portion.

15. The backpack type assembly according to claim 14, wherein the stand member further comprises:

a left bent portion having a shape of a rod bent in U-shape and connecting between the first extension portion and the second extension portion; and a right bent portion having a shape of a rod bent in U-shape and connecting between the third extension portion and the fourth extension portion, the left foot portion is located on a lower surface of the left bent portion, the right foot portion is located on a lower surface of the right bent portion, the backpack type assembly further comprises a coupling member configured to couple the lower coupling portion of the stand member to the backpack type carrier body, the coupling member comprises an end surface configured to contact the placement surface when the backpack type assembly is placed on the placement surface, the stand member is formed by bending a single rod-shaped member, the rod-shaped member is a hollow pipe, the device is a power supply including a plurality of rechargeable battery cells, in a left side view, an angle formed by a straight line connecting the upper coupling portion and the lower coupling portion and a straight line connecting the lower coupling portion and the left foot portion is 90 degrees or more, in a right side view, an angle formed by a straight line connecting the upper coupling portion and the lower coupling portion and a straight line connecting the lower coupling portion and the right foot portion is 90 degrees or more, the backpack type carrier body further includes:

a back plate to which the pair of shoulder straps and the device are attached;

a waist belt configured to be wrapped around a waist of the user; and a connection mechanism configured to connect between the back plate and the waist belt, the connection mechanism comprises an elastic member having a flexural rigidity smaller than a flexural rigidity of the back plate, a force applied to the connection mechanism from one of the back plate and the waist belt is transmitted through the elastic member to the other of the back plate and the waist belt, the elastic member is disposed forward of a front surface of the back plate, the elastic member comprises:

a plate portion extending along a rear surface of the waist belt and attached to the waist belt such that an orientation of the plate portion relative to the waist belt does not change;

a fastening portion disposed rearward of a rear surface of the plate portion and configured to be fastened to the front surface of the back plate by a predetermined fastener; and a connection portion connecting between the plate portion and the fastening portion, the fastening portion is disposed above an upper end of the plate portion, the connection portion comprises a connection surface connected to a front surface of the plate portion and extending upward from an upper end of the plate portion, the connection surface comprises a curved surface curving away from an imaginary plane that is an imaginary extension of the front surface of the plate portion, the curved surface separating farther away from the imaginary plane at its portions farther away from the upper end of the plate portion, in a front view, a width of the connection surface in a left-right direction decreases monotonically as a distance from the upper end of the plate portion increases, the connection portion further comprises a recess recessed rearward from the connection surface, the fastening portion is disposed at a bottom of the recess, the elastic member further comprises a contact surface contacting a front surface of the back plate and a guide projection projecting rearward from the contact surface, the back plate comprises a guide hole receiving the guide projection, in a side view, a portion of the back plate below a lower end of the fastening portion is warped rearward, and the back plate further comprises:
    a back plate body to which the device is detachably attached;
    a support plate connected to the waist belt via the connection mechanism and configured to be movable in an up-down direction relative to the back plate body; and
    a locking mechanism configured to fix a position of the support plate relative to the back plate body in the up-down direction.

16. A backpack type carrier configured to be worn by a user to carry an object, comprising:
    a pair of shoulder straps configured to be worn on both shoulders of the user;
    a back plate to which the pair of shoulder straps is attached and the object is detachably attached;
    a waist belt configured to be wrapped around a waist of the user; and
    a connection mechanism configured to connect between the back plate and the waist belt,
wherein
the connection mechanism comprises an elastic member having a flexural rigidity smaller than a flexural rigidity of the back plate,
a force applied to the connection mechanism from one of the back plate and the waist belt is transmitted through the elastic member to the other of the back plate and the waist belt,
the elastic member is disposed forward of a front surface of the back plate,
the elastic member comprises:
    a plate portion extending along a rear surface of the waist belt and attached to the waist belt such that an orientation of the plate portion relative to the waist belt does not change;
    a fastening portion disposed rearward of a rear surface of the plate portion and configured to be fastened to the front surface of the back plate by a predetermined fastener; and
    a connection portion connecting between the plate portion and the fastening portion, and
the fastening portion is disposed above an upper end of the plate portion.

\* \* \* \* \*